(12) United States Patent
Cordova et al.

(10) Patent No.: US 10,094,284 B2
(45) Date of Patent: Oct. 9, 2018

(54) HIGH EFFECTIVENESS LOW PRESSURE DROP HEAT EXCHANGER

(71) Applicant: Mohawk Innovative Technology, Inc., Albany, NY (US)

(72) Inventors: Jose Luis Cordova, Rexford, NY (US); Hooshang Heshmat, Niskayuna, NY (US)

(73) Assignee: Mohawk Innovative Technology, Inc., Albany, NY (US)

(*) Notice: Subject to any disclaimer, the term of this patent is extended or adjusted under 35 U.S.C. 154(b) by 204 days.

(21) Appl. No.: 14/833,023

(22) Filed: Aug. 21, 2015

(65) Prior Publication Data

US 2016/0054071 A1 Feb. 25, 2016

Related U.S. Application Data

(60) Provisional application No. 62/040,559, filed on Aug. 22, 2014.

(51) Int. Cl.
  *F28D 7/02* (2006.01)
  *F28F 3/00* (2006.01)
  (Continued)

(52) U.S. Cl.
  CPC .............. *F02C 7/08* (2013.01); *F28D 9/0018* (2013.01); *F28D 21/001* (2013.01); *F28F 7/02* (2013.01);
  (Continued)

(58) Field of Classification Search
  CPC .... F28D 9/0056; F28D 9/0062; F28D 9/0075; F28D 9/0093; F28D 9/0012;
  (Continued)

(56) References Cited

U.S. PATENT DOCUMENTS 1,170,902 A * 2/1916 Harrison ............... F28D 9/0037
                                                            165/166
2,170,586 A   8/1939 Canfield
(Continued)

FOREIGN PATENT DOCUMENTS

EP   2236789 A1   10/2010
GB   2170586 A    8/1986
(Continued)

OTHER PUBLICATIONS

International Search Report for search completed Sep. 12, 2015, and International Preliminary Report on Patentability dated Feb. 28, 2017 for corresponding international application PCT/US2015/046367.

(Continued)

*Primary Examiner* — Jason Thompson
(74) *Attorney, Agent, or Firm* — James C. Simmons

(57) ABSTRACT

A heat exchanger in the form of a honeycomb with a plurality of rectangular or otherwise polygon in cross-section passages which share common walls with adjacent passages. Two or more flow paths each comprises a plurality of serially connected passages. Each flow path passes through the heat exchanger in a helical pathway, thus through one passage in a first vertical stack of passages, then through a lower passage in an adjacent second vertical stack of passages, then through a lower passage in the first vertical stack, then through a lower passage in the second vertical stack and in this helical manner to the outlet from the heat exchanger. Thus, the flow path comprises alternate passages in each vertical stack, and another flow path comprises the alternate passages in at least one of the vertical stacks not taken up by the first flow path, whereby the flow paths at least partially overlap each other thereby providing both counter-flow and co-flow.

21 Claims, 20 Drawing Sheets

(51) Int. Cl.
  *F28F 3/08* (2006.01)
  *F28F 7/00* (2006.01)
  *F28F 9/26* (2006.01)
  *F02C 7/08* (2006.01)
  *F28F 7/02* (2006.01)
  *F28D 9/00* (2006.01)
  *F28D 21/00* (2006.01)
  *F28D 7/08* (2006.01)

(52) U.S. Cl.
  CPC ............ *F28F 9/26* (2013.01); *F28D 7/085* (2013.01); *F28D 2021/0026* (2013.01)

(58) Field of Classification Search
  CPC .... F28D 9/0018; F28D 9/0037; F28D 9/0043; F28D 9/005; F28F 9/005; F28F 9/0263; F28F 2009/029; F28F 7/02; F28F 3/086
  USPC ........ 165/139, 144, 145, 164, 165, 166, 167
  See application file for complete search history.

(56) References Cited

U.S. PATENT DOCUMENTS

| | | | |
|---|---|---|---|
| 2,217,316 A * | 10/1940 | Kallsteinus | F28D 9/04 165/167 |
| 3,831,874 A | 8/1974 | Stein et al. | |
| 3,991,457 A * | 11/1976 | Barton | B23P 15/26 29/890.038 |
| 4,085,588 A | 4/1978 | Reams | |
| 4,149,591 A * | 4/1979 | Albertsen | F28F 7/02 165/165 |
| 4,155,981 A | 5/1979 | Chubb | |
| 4,466,482 A | 8/1984 | Dorazio et al. | |
| 4,546,827 A | 10/1985 | Wachendorfer, Sr. | |
| 4,602,674 A | 7/1986 | Eriksson | |
| 4,787,443 A | 11/1988 | Fukatsu et al. | |
| 5,016,707 A | 5/1991 | Nguyen | |
| 5,388,398 A | 2/1995 | Kadambi et al. | |
| 5,725,051 A | 3/1998 | Veltkamp | |
| 5,832,992 A | 11/1998 | Van Andel | |
| 5,983,992 A | 11/1999 | Child et al. | |
| 6,034,872 A | 3/2000 | Chrysler et al. | |
| 6,082,445 A | 7/2000 | Dugan | |
| 6,192,975 B1 | 2/2001 | Yanai et al. | |
| 6,209,630 B1 | 4/2001 | Yanai et al. | |
| 6,390,185 B1 | 5/2002 | Proeschel | |
| 6,510,894 B1 * | 1/2003 | Watton | B01J 19/0013 165/166 |
| 6,634,176 B2 * | 10/2003 | Rouse | F01D 25/30 60/39.511 |
| 6,729,387 B2 | 5/2004 | Replogle et al. | |
| 6,827,138 B1 | 12/2004 | Master et al. | |
| 6,896,043 B2 | 5/2005 | Dunn | |
| 7,147,050 B2 | 12/2006 | Kang et al. | |
| 7,237,604 B2 | 7/2007 | Emrich et al. | |
| 7,285,153 B2 | 10/2007 | Bruun et al. | |
| 7,415,764 B2 | 8/2008 | Kang et al. | |
| 7,597,136 B2 | 10/2009 | Kite et al. | |
| 8,215,378 B2 | 7/2012 | Nash et al. | |
| 8,251,133 B2 | 8/2012 | Van Decker et al. | |
| 8,439,103 B2 | 5/2013 | Reinders | |
| 8,573,291 B2 * | 11/2013 | Vick | F02C 3/08 165/166 |
| 2005/0098309 A1 | 5/2005 | Kang et al. | |
| 2005/0217837 A1 | 10/2005 | Kudija, Jr. | |
| 2006/0151147 A1 * | 7/2006 | Symonds | F28D 9/0012 165/11.1 |
| 2007/0189740 A1 * | 8/2007 | Clements | F02C 7/224 392/471 |
| 2008/0202114 A1 * | 8/2008 | Naterer | F02G 1/043 60/508 |
| 2010/0224346 A1 * | 9/2010 | Rasmussen | F28D 9/0012 165/109.1 |
| 2011/0011569 A1 | 1/2011 | Baker | |
| 2011/0120685 A1 | 5/2011 | Van Heeswijk et al. | |
| 2012/0055420 A1 * | 3/2012 | Jung | F24H 1/32 122/135.1 |
| 2012/0055421 A1 * | 3/2012 | Rausch | F24H 1/43 122/231 |
| 2012/0291991 A1 | 11/2012 | Denkenberger | |
| 2013/0074516 A1 | 3/2013 | Heward et al. | |
| 2016/0290664 A1 | 10/2016 | Dean et al. | |

FOREIGN PATENT DOCUMENTS

| | | |
|---|---|---|
| JP | H1163860 A | 3/1999 |
| JP | 200324796 A | 9/2003 |
| JP | 2004293895 A | 10/2004 |
| WO | 9416272 | 7/1994 |
| WO | 9848230 | 10/1998 |
| WO | 2004013557 A1 | 2/2004 |

OTHER PUBLICATIONS

Vick, M., thesis entitled "High Efficiency Recuperated Ceramic Gas Turbine Engines for Unmanned Air Vehicle Propulsion," Imperial College, London, UK, 2012.
Moran, M. et al, Fundamentals of Engineering Thermodynamics, 2000, Wiley, pp. 452-454.
El-Wakil, M., Powerplant Technology, McGraw-Hill, 1984, pp. 323-324.
Incropera, F. et al., Fundamentals of Heat and Mass Transfer, 4th ed, 1996, Wiley, pp. 599-600.
European search report, dated Jul. 23, 2018, for corresponding European application EP 15833589.5.
European search opinion for corresponding European application EP 15833569.5.

* cited by examiner

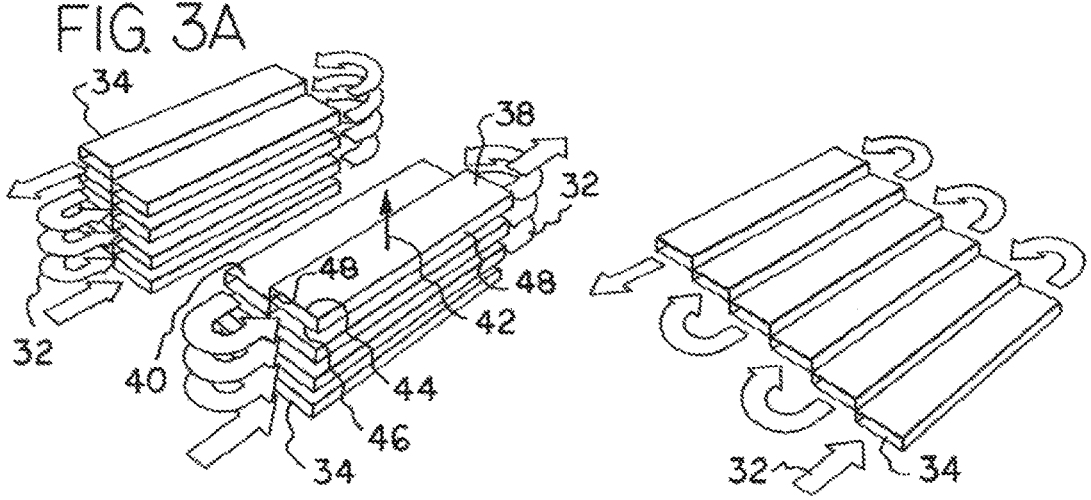
FIG. 3A
FIG. 3B
FIG. 3C
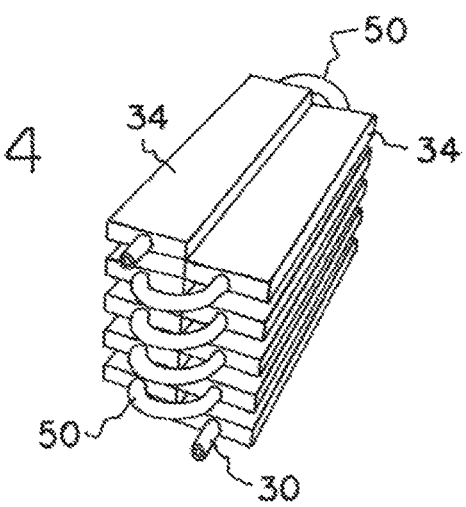
FIG. 4

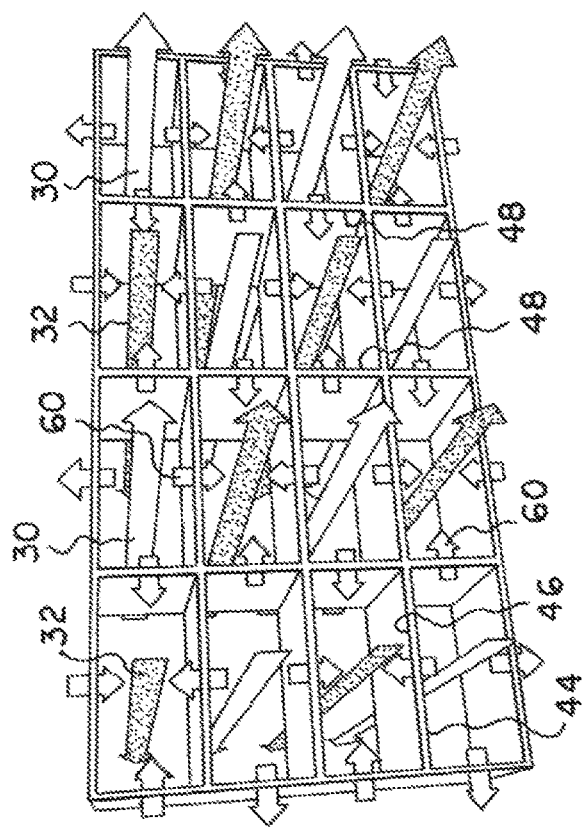
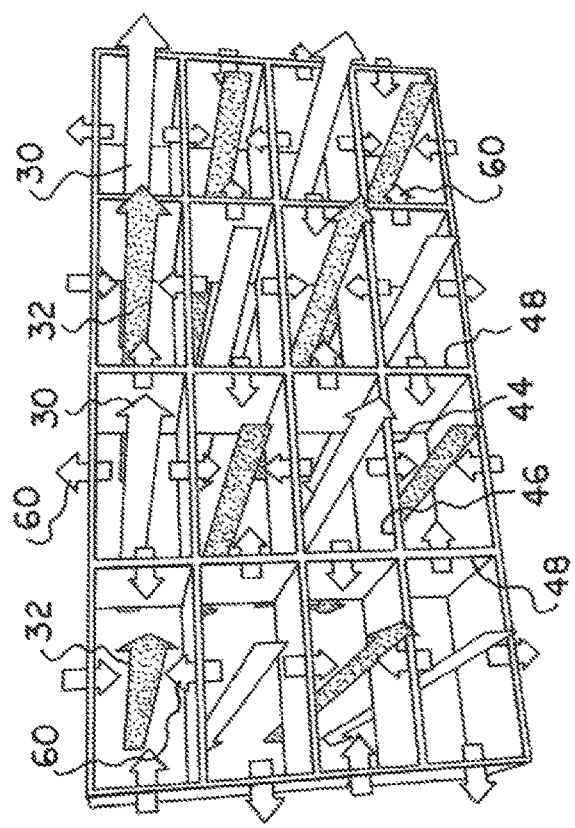

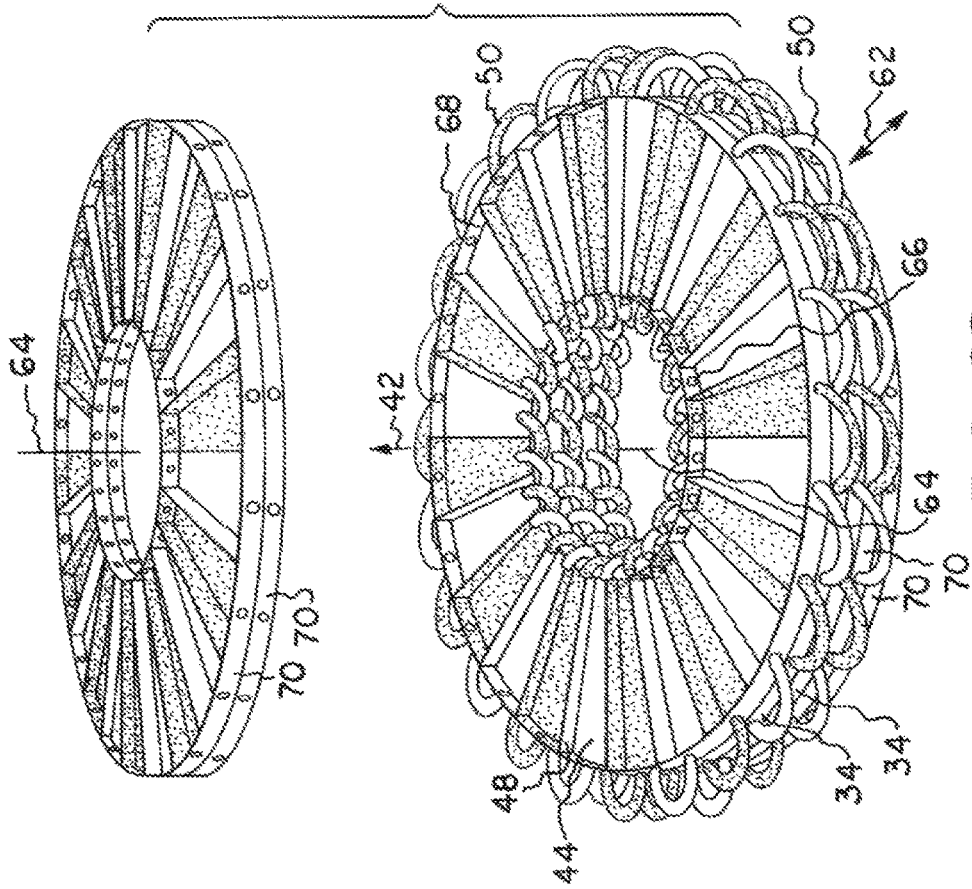
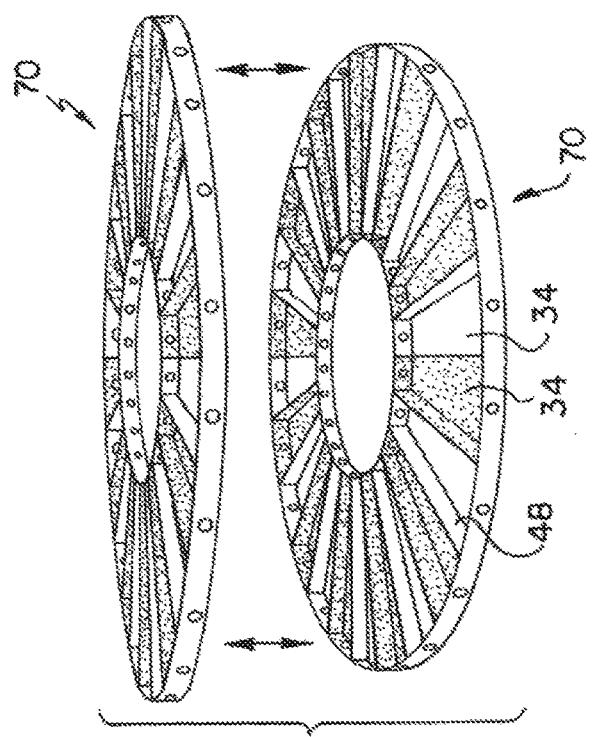
FIG. 9A
FIG. 9B

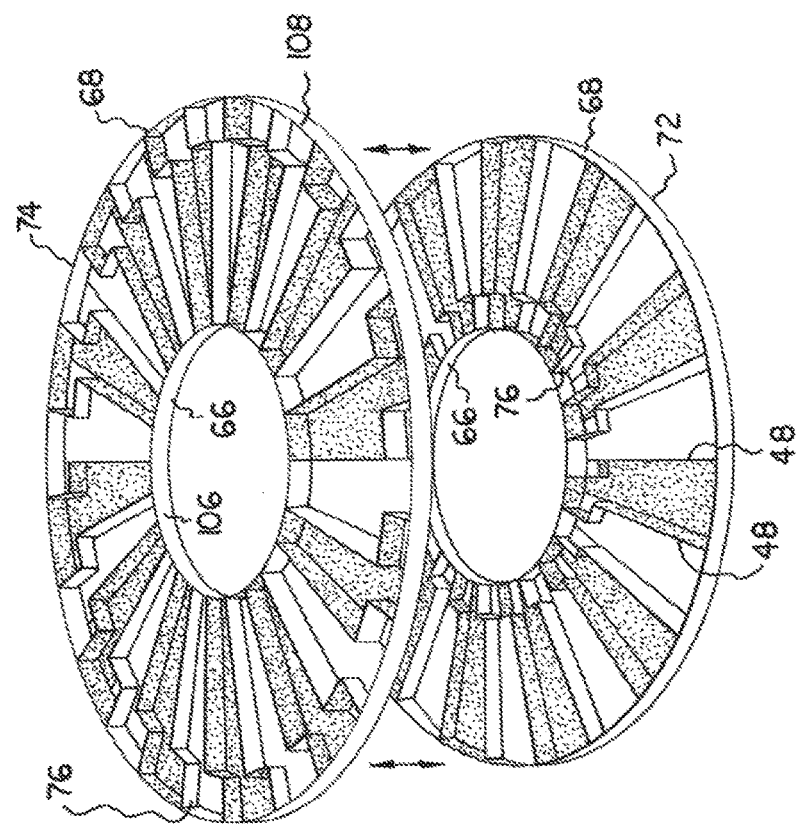
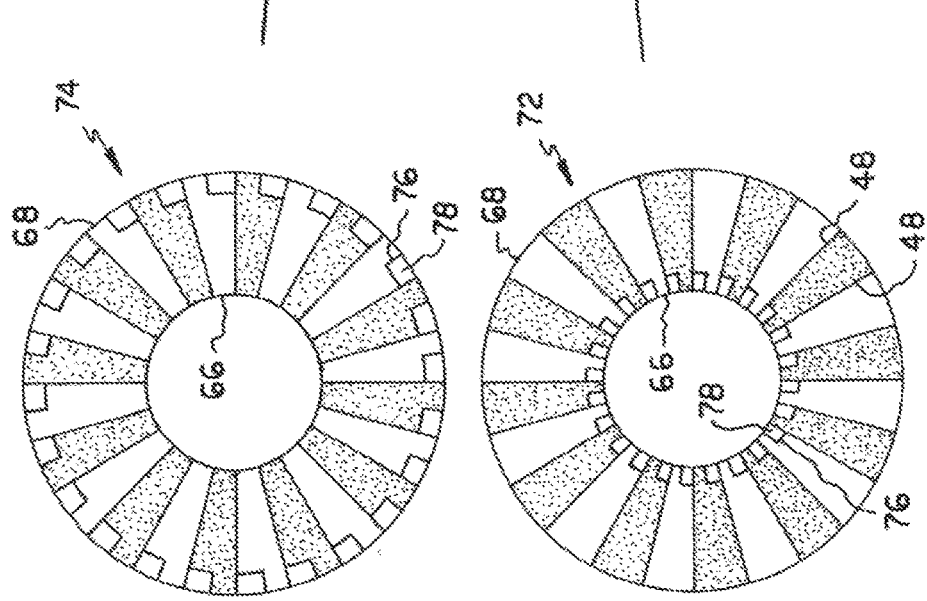
FIG. 10

HIGH EFFECTIVENESS LOW PRESSURE DROP HEAT EXCHANGER

The priority of U.S. provisional application 62/040,559, filed Aug. 22, 2014, the disclosure of which is incorporated herein by reference, is hereby claimed.

The present invention is generally related to the field of heat exchangers such as, for example, compact high temperature gas-to-gas heat exchangers such as, but not limited to, recuperators for Ericsson Cycle engines, drying fluid Organic Rankine Cycle engines, preheated cathode-air fuel cells, and Brayton Cycle gas turbine engines. While the present invention is discussed herein primarily in the context of Brayton Cycle gas turbine engines, it may be applied to a general application heat exchanger, and the present application should not be read as limiting the scope of application of the invention or its principle of operation.

BACKGROUND

A Brayton Cycle gas turbine engine extracts energy from a flow of gas to produce shaft power, thrust, compressed air, or a combination of these, and generally comprises a turbine, a compressor coupled to the turbine, and a combustor, which receives compressed air or gas from the compressor and in which energy is derived from the combustion of a fuel. Optionally, the system can also include a recuperator, which is a type of heat exchanger that uses the waste heat from the turbine exhaust gas to preheat the compressor discharge air prior to its entering the combustor, thereby increasing the thermodynamic efficiency of the gas cycle.

There is illustrated in FIG. 18 of the drawings a schematic of a recuperated Brayton Cycle gas turbine engine (reference Moran, M. and Shapiro, H., *Fundamentals of Engineering Thermodynamics*, 2000, Wiley, at pp. 452-456). The principal gas thermodynamic states characterizing the Brayton Cycle are identified in FIG. 18 as compressor inlet 1, compressor discharge 2, combustor exit or turbine inlet 3, and turbine exhaust 4, while the recuperator-specific states are identified as preheated compressor flow 5 and final exhaust 6.

The thermal efficiency N of the recuperated Brayton Cycle turbine engine is given by $$N = \frac{Wt - Wc}{Qc - Qr}$$

hereinafter referred to as Equation 1, wherein, in terms of gas enthalpy at each of the states as labeled in FIG. 18, and denoted by H, and the gas flow rate M, the turbine work is expressed as Wt=M(H3−H4), the compressor work is Wc=M(H2−H1), the heat supplied by the combustor is Qc=M(H3−H5), and the recuperated heat is Qr=M(H5−H2).

Theoretically, the maximum amount of heat that can be recuperated for compressor discharge flow preheat would occur if all the heat from the turbine exhaust could be transferred to the compressor flow, and is given by Qr max=M(H4−H2). In practice, the recuperated heat is only a fraction of the maximum, and is set by the geometric and flow characteristics of the heat exchanger used as recuperator. This fraction is defined to be the recuperator heat transfer effectiveness (Incropera, F. P. and DeWitt, D. P., *Fundamentals of Heat and Gas Transfer*, Wiley, 1996, at p. 600), denoted by Er, and expressed as Er=Qr/Qr max, or $$Er = \frac{H5 - H2}{H4 - H2}$$

hereinafter referred to as Equation 2.

Combining both equations 1 and 2, one obtains the correlation between cycle efficiency and recuperator effectiveness:

$$N = \frac{(H3 - H4) - (H2 - H1)}{(H3 - H2) - (H4 - H2)Er}$$

hereinafter referred to as Equation 3.

In an ideal situation, a recuperator with Er approaching 1 (or 100% effectiveness) would raise the enthalpy (or more tangibly, the temperature) of the compressor discharge isobarically to match the enthalpy of the turbine exhaust with no pressure drop to burden the engine, thereby attaining the recuperated engine's maximum theoretical thermal efficiency, given by Nmax=1−(H2−H1)/(H3−H4).

In practical terms, a heat exchanger cannot achieve 100% effectiveness or zero pressure drop impact on the engine. However, in order to satisfy the requirements of a gas turbine operating within a given range of conditions, a recuperator should desirably be designed to maximize heat transfer effectiveness while minimizing the pressure impact or penalty on engine operation. These two conditions have typically involved competing design requirements, which result in difficult tradeoffs that must be balanced according to the specific needs of the target application.

A heat exchanger in accordance with the present invention is provided which allows design freedom to manipulate particularly the cross-section (but also the flow paths there through) of the flow passages to maximize heat transfer and minimize pressure loss, as considered best for the particular application of interest. As can be seen from equation 3, in addition to effectiveness, each of the enthalpies h has an influence on the thermal efficiency.

While the present invention should not be considered as being limited to any particular size of gas turbine or other engine, it is considered very suitable for small gas turbines, i.e., those in the meso-scale and micro-scale range. Meso-scale and micro-scale engines are defined for the purposes of this specification and the claims as engines having power outputs of 100 watts to 15 kW (kilowatts) and 15 to 200 kW respectively.

It is an object of the present invention to provide a meso-scale gas turbine engine (as well as a micro-scale gas turbine engine) or other ultra-small size engine, for example, a gas turbine providing portable power for a foot soldier. Such a meso-scale engine may have a size of about 8 kW equaling about 10 hp (horsepower) and may weigh about 10 pounds plus the weight of any recuperator.

In order to be considered suitable for addition of a recuperator so that it will work properly, it is considered that a gas turbine should have a low pressure ratio (the ratio of the high inlet pressure to the gas turbine to the low outlet pressure thereof) on the order of 5:1 or less, for conditions typical of a meso-scale or micro-scale gas turbine with normal component adiabatic efficiencies. If the adiabatic efficiency of the turbine and compressor are high enough, which however is normally difficult to achieve, the pressure ratio where a recuperator could be used would be higher. Inspection of a Brayton Cycle T-s (temperature-entropy) state diagram shows that this pressure ratio makes them well suited to derive benefits from the use of heat recovery devices like recuperators (El Wakil, M., *Powerplant Technology*, McGraw-Hill, 1984, at pp. 323-324), since the turbine exhaust temperature can be significantly higher than the compressor discharge temperature. While larger gas turbines may often have higher pressure ratios and thus be considered unsuitable for the addition of recuperators, meso-scale and micro-scale gas turbine engines are typically characterized by operating at low pressure ratios, i.e. in the range of 2 to 3, thus making them suitable for the addition of recuperators for increasing efficiency. Non-recuperated meso-scale and micro-scale gas turbine engines typically present thermal or cycle efficiencies in the range of 7% to 13%, with engine thermal efficiency defined as the ratio between net work produced and heat input. It is considered desirable to substantially increase this efficiency, by the addition of a suitable recuperator.

In their efforts to develop such a gas turbine engine in which a suitable higher efficiency could be achieved, the inventors of the present invention received bids for recuperators which would undesirably weigh in excess of 100 pounds. They were not able to find commercially a recuperator providing the desired high efficiency but of a suitably light weight so that the gas turbine engine could still be light enough so that the recuperated gas turbine could be portable by a foot soldier.

For the operating conditions typical of a meso-scale or micro-scale gas turbine, as will become more apparent hereinafter, a tripling of the thermal efficiency by use of such a heat exchanger would not be unexpected.

DISCUSSION OF ART OF INTEREST

A number of prior art recuperators have attempted to achieve optimal balance between maximum heat transfer and minimum pressure losses. High heat transfer effectiveness requires long flow residence times, large heat exchange surface areas, and potentially heat exchange-increasing features, like surface rugosity or turbulence enhancers, all of which result in high pressure drop. The incorporation of these features may result in relatively voluminous passage walls and hardware, over which thermal gradients form that ultimately translate into parasitic heat losses to ambient. Additionally, the pressure difference between working fluids may produce net forces on the heat exchange surfaces that may require fabrication with thicker passage walls. Ultimately, practical considerations typically result in compromises that sacrifice effectiveness for lower pressure drop, or vice-versa, or which sacrifice robustness to pressure loading.

U.S. Pat. No. 6,390,185 describes some typical approaches which have been followed in the recuperator field. For example, it describes the use of thin plate counter-flow heat exchangers in U.S. Pat. No. 5,983,992, or an annular recuperator composed of side-by-side annular plates described in U.S. Pat. No. 5,388,398, both of which result in geometries that make the recuperators difficult to manufacture, and exhibit insufficient robustness to leaks or differential pressure loading. The annular flow concentric tube recuperator presented in the afore-mentioned U.S. Pat. No. 6,390,185 exhibits some drawbacks, like operation in a laminar regime (at high flow rates, maintaining laminarity undesirably requires a large number of small cross-section passages), possible issues with flow mal-distribution, and difficult incorporation as an integral component of a gas turbine housing or combustor. U. S. published patent application 2010/0293946 to Vick and U.S. Pat. No. 8,573,291 which issued therefrom (related to Vick, M. J., *High Efficiency Recuperated Ceramic Gas Turbine Engines for Small Unmanned Air Vehicle*, 2012 dissertation, Imperial College) disclose an annular recuperator having a plate heat exchanger with a large number of thin ceramic wafers. This heat exchanger is geometrically complex and costly to fabricate.

U.S. Pat. No. 5,725,051 discloses a heat exchanger comprising parallel adjacent ducts (triangular or parallelogram or rectangular in cross section) separated by walls, wherein each separating wall is bounded on one side by a first duct for carrying a first fluid and on the other side by a second duct for carrying a second fluid. These first and second ducts are arranged in a regular pattern, an example being called a chess board pattern.

In this '051 patent, a connecting piece, illustrated at 6 in FIG. 5 thereof, connects one end of the first ducts to a first connection, illustrated at 14 in FIG. 5 thereof, and one end of the second ducts to a second connection, illustrated at 15 in FIG. 5 thereof. Such a connecting piece arrangement provides for all flows of a fluid in the same direction from one end to the other through the heat exchanger, which undesirably prevents the ability to provide both counter-flow and co-flow.

U.S. Pat. No. 5,832,992 discloses a thin-plate counter-flow heat exchanger in which, as in the above '051 patent, all flows of a fluid are in the same direction from one end to the other through adjacent ducts or capillaries of the heat exchanger, as best seen by the arrows in FIG. 5 thereof. Thus, the capillaries are connected at their ends to what is called a common feed and a common outlet (col. 4, lines 59 to 61, thereof).

U.S. Pat. No. 7,285,153 also shows a heat exchanger wherein, as in the '051 and '992 patents, all flows of a fluid are in the same direction from one end to the other, as noted in FIGS. 7 and 8 thereof which show manifolds for distributing fluids.

U.S. Pat. No. 7,237,604 also shows a heat exchanger (having distributor and collector channels) wherein, as in the '051, '992, and '153 patents, all flows of a fluid are in the same direction from one end to the other.

UK patent application 2,170,586 discloses a heat exchanger comprising a block (one-piece plastic extrusion) with a plurality of parallel through-flow ducts which are separated from one another (both vertically and horizontally) by walls in what is described as a honeycomb formation.

U.S. Pat. No. 8,439,103 discloses a heat exchanger comprising two sets of medium through-flow channels separated by walls, with arrows P and S illustrating counter-flow heat exchange.

Other patents/published application which also have honeycomb or chess board type flow path designs include U.S. Pat. Nos. 4,787,443; 6,729,387; 6,896,043; and U.S. published application 2005/0217837.

U.S. Pat. No. 6,034,872 discloses a refrigeration system for computer systems. Referring to FIG. 8A and col. 10, first two full paragraphs, the cold plate thereof includes serpentine but isolated passages for flow of fluids. See also U.S. Pat. No. 4,602,674 (particularly FIG. 1A thereof).

U.S. patents/published application U.S. Pat. Nos. 4,466,482, 4,546,827, 5,016,707, and 2011/0011569 disclose a flow path of a fluid (or both fluids) through a heat exchanger wherein the flow path doubles back on itself. See also U.S. Pat. No. 4,155,981.

U.S. Pat. Nos. 6,192,975 and 6,209,630 disclose an annular shaped heat exchanger disposed to surround an outer periphery of an engine body wherein there are gas passages adjacent air passages (see reference numerals 4 and 5 respectively in FIG. 5 thereof). An arrangement is provided which is said to realize a counter flow and a so-called cross flow, which is said to provide a high heat exchange efficiency. See col. 4, line 52 through col. 5, line 63, of the '630 patent. Thus, each of a plurality of modules is formed by folding a plurality of folding plate blanks each comprised of a plurality of first heat transfer plates and a plurality of second heat transfer plates which are alternately connected through folding lines in a zig-zag fashion along the folding lines with the passages 4 and 5 defined alternately in the circumferential direction by the plates. A fluid passage inlet and a fluid passage outlet, denoted at 11 and 12 respectively therein, are defined at axially opposite ends of the passages 4, and a fluid passage inlet and a fluid passage outlet, denoted at 15 and 16 respectively therein, are defined to open at axially opposite ends of the passages 5.

U.S. published application 2011/0120685 discloses a heat exchanger. Referring to FIG. 4 thereof, the heat exchanger is in the form of a dew point cooler. A primary air flow A enters at inlet 34 and flows between primary channels 26 between plates 10, wherein the flow is cooled by heat transfer to the plates. On exit from the primary channels, the flow is split to form a cooled product flow C and secondary flow B. The flow B is returned through secondary channels 28 between plates 10, where it is heated by heat transfer from the plates 10 to return it close to its original temperature. See paragraph 0089 thereof. Members 22 are described as spacers which separate the primary from the secondary channels. See paragraph 0071 thereof.

U.S. published application 2012/0291991 discloses a heat exchanger manufactured by bonding sheets of material to form core and manifold portions. It is said that the flow configurations thereof may be one of counter-flow, parallel flow, or cross flow and may accommodate more than two fluids. See paragraphs 0012 and 0013 thereof.

U.S. Pat. No. 6,634,176 discloses a turbine engine with an annular recuperator surrounding the turbine.

U.S. Pat. No. 4,085,588 discloses a concentric recuperator (called therein cross-flow) for Stirling engine, wherein a preheater is comprised of a concentric toroid placed about a heater tube array.

International application publication WO 9848230 (from which European patent document EP0977972 is derived) discloses a plate recuperator which is said to provide cross flow and counter-flow.

Other art which may be of interest to the present invention is U.S. Pat. Nos. 6,827,138; 7,147,050; 7,597,136; 8,215,378; and 8,251,133, and European patent documents EP1554534; EP1965165; and EP2236789. These and other patents and published applications discussed herein are all incorporated herein by reference.

None of the above references allows ease of design adjustment of the flow passages to achieve a balance between a maximized heat transfer at a minimized pressure drop, as suitable or optimum for a specific application.

U.S. Pat. No. 7,415,764 discusses that, for a 200 kW microturbine, much larger physical size and much greater heat transfer demands led to the development of the recuperator disclosed therein, i.e., wherein recuperator core segments are composed of corrugated foils, and that improving the efficiency of the radial distribution of compressed air within the recuperator core segments will allow use of recuperator core segments having a greater radial width to axial length ratio while maintaining a high level of heat exchanger effectiveness. If it can be done, it may be difficult to scale down to the size of a portable meso-scale turbine which maintains a low pressure burden. In this patent, the assignee claims to have employed annular recuperators in 30 kW microturbines, wherein airflow enters and exits the recuperator in a radial direction and the gas flows in an axial direction of the engine. It is further stated in this patent that, with a recuperator, the efficiency of microturbine power conversion efficiency improves from at most 20 percent to between 30 and 40 percent, depending on the recuperator's effectiveness.

U.S. published application 2013/0074516 discloses the use of recuperators with gas turbines and discusses the use of gas turbines in 10 kW generators.

SUMMARY OF THE INVENTION

It is accordingly an object of the present invention to maximize heat transfer while minimizing pressure drop in a heat exchanger.

It is another object of the present invention to provide a heat exchanger wherein both heat transfer and pressure drop are optimized for a specific application.

It is a further object of the present invention to provide such a heat exchanger with minimal weight.

In order to achieve the above objects, in accordance with the present invention, a heat exchanger is provided wherein each fluid passage is bounded by at least three walls (triangular in cross-section) with each wall serving as a wall for an adjacent passage for heat transfer across the walls to adjacent passages and providing for both co-flow (as used herein and in the claims, defined as the type of flow wherein both fluids on opposite sides of a wall flow in the same direction) and counter-flow (as used herein and in the claims, defined as the type of flow wherein the fluids on opposite sides of a wall flow in opposite directions) which allows for design adjustment to achieve a maximized heat transfer at a minimized pressure drop, as suitable or optimum for the specific application.

Such a heat exchanger having co-flow as well as counter-flow of its fluids, with perhaps also some cross-flow heat transfer (wherein the flow of one fluid may be said to be generally normal to the flow of an other fluid, which may be brief transition flow as the fluid changes direction to flow in the opposite direction), is referred to herein and in the claims as a "mixed mode" heat exchanger. Such a mixed mode heat exchanger is arranged, as discussed herein, to provide high effectiveness (defined as the ratio of actual heat exchanged to the theoretical maximum for given conditions) and a low pressure drop on the working flow streams. In general, its high effectiveness and low pressure penalty characteristics are provided to make it suitable for application to a pressure-drop sensitive device that may benefit from exhaust heat recuperation, such as, but not limited to, Ericsson Cycle engines, drying fluid Organic Rankine Cycle engines, or preheated cathode-air fuel cells. In particular, in a radial configuration, it is considered to be ideally suitable for use as a Brayton Cycle gas turbine engine recuperator.

A preferred heat exchanger is provided with two or more overlapping helical flow paths, over which two or more working flows are distributed. For an example of a three or more flow path heat exchanger, such a heat exchanger may be provided for the purpose of equalizing the temperatures of three or more fluid streams. For such a distribution of two or more flows, at any location, the passage walls surrounding a given stream of each working flow are in contact with streams of a different working flow, thereby to establish an alternating patchwork pattern such as what might be called a chessboard pattern of hot/cool gas flow, thereby to maximize heat transfer between working flows while minimizing pressure drop. The flow paths or trajectories are defined by parallel or radially oriented stacks of thin-walled circuits of rectangular, triangular, or other polygonal cross-section.

For a preferred heat exchanger for a gas turbine engine, flows from a compressor discharge and turbine exhaust flow into the heat exchanger, where they are divided over a multiplicity of serpentine passages. The serpentine passages are arranged such that as an individual stream flows through the unit, it is forced to follow a helical flow path of relatively small axial pitch, first moving radially outwardly through one passage or duct, being made to turn in the axial direction, then radially inwardly through another passage or duct, and forced to turn axially again, then again moving radially outwardly, with this pattern repeating multiple times along the length of the heat exchanger. By overlapping the helical flow paths, the passages carrying one working flow are staggered in the aforementioned chess-board pattern with respect to those passages carrying the other flow or which may be characterized as a spiral pattern, i.e., like a screw thread. In this manner, the walls of each passage or duct represent boundaries separating streams of the different working fluids, allowing for the maximization of heat transfer while minimizing pressure drop.

The above and other objects, features, and advantages of the present invention will be apparent in the following detailed description of the preferred embodiment(s) thereof when read in conjunction with the appended drawings in which the same reference numerals depict the same or similar parts throughout the several views.

BRIEF DESCRIPTION OF THE DRAWINGS

FIGS. 1 to 11 are progressive schematics illustrating the conceptual arrangement of flow paths through a heat exchanger on which the present invention is based and the development of a heat exchanger in accordance therewith.

DETAILED DESCRIPTION OF THE PREFERRED EMBODIMENT(S)

Figure 1:
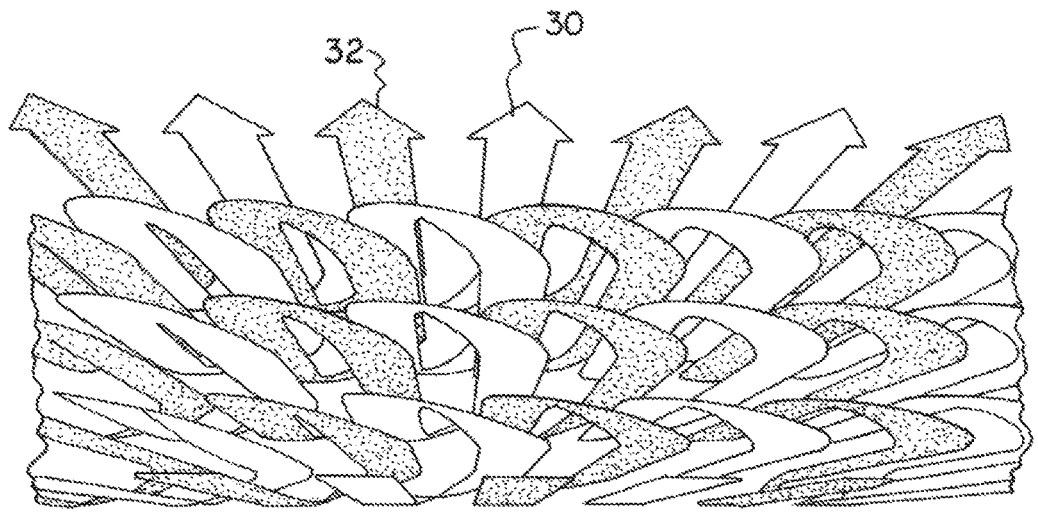
Figure 2:
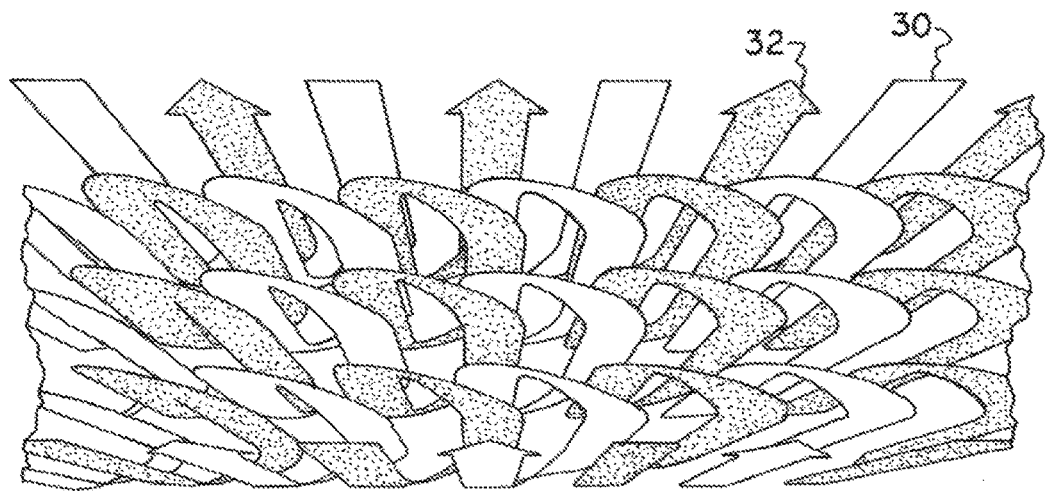

Conceptually, and independent of any particular hardware incarnation to attain them, the flow paths are illustrated by the overlapping quasi-helical arrows 30 and 32 in FIGS. 1 and 2. The arrows 30 and 32, shown un-stippled and stippled respectively, represent two different working flows, say hot and cold respectively, though the present invention should not be considered as limited to two flows, as more than two working flows may be accommodated. Similarly, throughout the drawings, for ease of illustration, alternate passages for the flow of alternate fluids are shown as un-stippled and stippled respectively.

FIG. 1 illustrates the relationship between the overlapping paths 30 and 32 as if the fluids enter a heat exchange device from the same side or terminus, following quasi-helical or generally helical (which herein may be called "helical") trajectories that may be said to fold over each other, thereby establishing, as can be seen in FIG. 1, overlapping regions of flows of fluids which have different temperatures. This allows the flow paths 30 and 32 to be arranged so that counter-flow heat transfer may occur across bounding walls in one direction such as vertical, while co-flow heat transfer may occur across bounding walls in an other direction such as horizontal.

FIG. 2 illustrates the helical flow paths 30 and 32 as if the working fluids enter the device from opposite sides or termini (plural of terminus).

FIGS. 3A and 3B are schematic illustrations of arrangements of ducts or fluid passages 34 with helical flow paths 32 which embody the present invention. A number of ducts 34 are arranged in a pair of adjacent stacks 38 and 40 through which a flow path 32 is formed by serially attaching a plurality of ducts 34 in the stacks 38 and 40. It can be seen that the flow path 32 is defined by alternating ducts 34 in each stack, with each successive duct 34 in the flow path 32 being at a successively higher/lower elevation. Thus, the flow path 32 alternates between the passages 34 of a first group 38 and passages 34 of an adjacent second group 40 and in each group flows through alternate passages 36. It should be apparent that the other flow path 30 may comprise the alternate passages 34 in each stack not taken up by flow path 32, so that the flow paths 30 and 32 may be said to be fully overlapping (or as discussed hereinafter with respect to FIGS. 5 and 6 may be partially overlapping and thus comprise ducts 34 in one of the stacks shown in FIGS. 3A and 3B and ducts 34 in the other adjacent stack not shown in FIGS. 3A and 3B). It should of course be understood that, as will be apparent hereinafter, a heat exchanger may comprise a multitude of stacks of ducts 34. This illustration should not be considered to be limiting in the number of passages or their aspect ratio, as these are to be defined according to particular application conditions, including, but not limited to, required heat transfer rates, design pressure drop, acoustic performance, or extents of catalytic surface areas.

Figure 17:
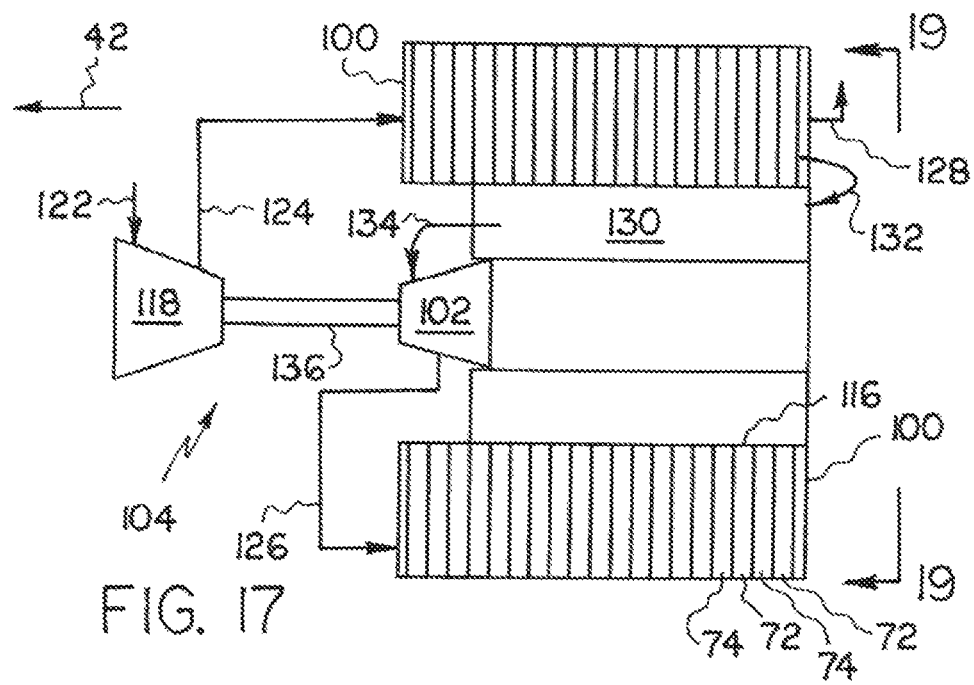
FIG. 17 is a schematic illustration of the physical arrangement of components in a gas turbine engine which embodies the present invention.

For ease of illustration and description, an arbitrary direction is defined, for the purposes of this specification and the claims, as the vertical direction, illustrated at 42 in FIG. 3B. Thus, each stack or group 38 and 40 of passages is defined in FIG. 3B as being vertically oriented, even though in actual use the group of passages may be oriented horizontally, as illustrated in FIG. 17, or in some other direction. With this arbitrary vertical direction 42 as a reference, each passage 34 may be defined to have an upper wall 44, a lower wall 46, and a pair of side walls 48. Similarly, for the purposes of this specification and the claims, the terms "upper" and "lower" and similar terms are also arbitrarily chosen with regard to placement of one wall relative to another vertically as well as flow vertically.

It should be understood that other flow paths are envisioned which enbody the present invention. For example, FIG. 3C illustrates a flow path 32 which comprises serially connected ducts 34 in a plurality such as 6 successive stacks so that the flow path "climbs" successively higher/lower as it moves successively from one stack to the next.

FIG. 4 illustrates an exemplary (and of course not limiting) manner of completing one of the helical flow paths 30 by serially connecting ends of ducts 34 via tubing 50, it of course being understood that flow path 32 may be similarly formed. This assembly should of course also not be considered as limiting the invention, as any manner of connecting the passages, such as described for FIG. 4, can be used. Moreover, the helical passages 34 may not only be aligned in parallel, i.e., end to end or side to side, as depicted in FIGS. 1 to 8 of the drawings, but also can be aligned in other ways such as, for example, radially, as depicted hereinafter with reference to FIGS. 9 to 13 and 20 to 25 of the drawings.

It should of course be understood that, in addition to the tubing 50, the ends of ducts 34 may be connected in various other suitable ways, for example, via elongated and curved sections integral to the respective passages, as provided by extrusion, casting, additive manufacturing, or any other suitable means of fabrication, or via any other suitable formed passages connecting ends of ducts, or via suitable internal openings or passages, such as discussed hereinafter with respect to FIGS. 12, 13, and 20 to 25 of the drawings, shaped or otherwise provided at the ends of passages 34. As used herein and in the claims, "means for flow connecting ones of said passages serially" is meant to include all of these various ways, both internally and externally, of connecting passages 34 one to another serially.

Figure 7:
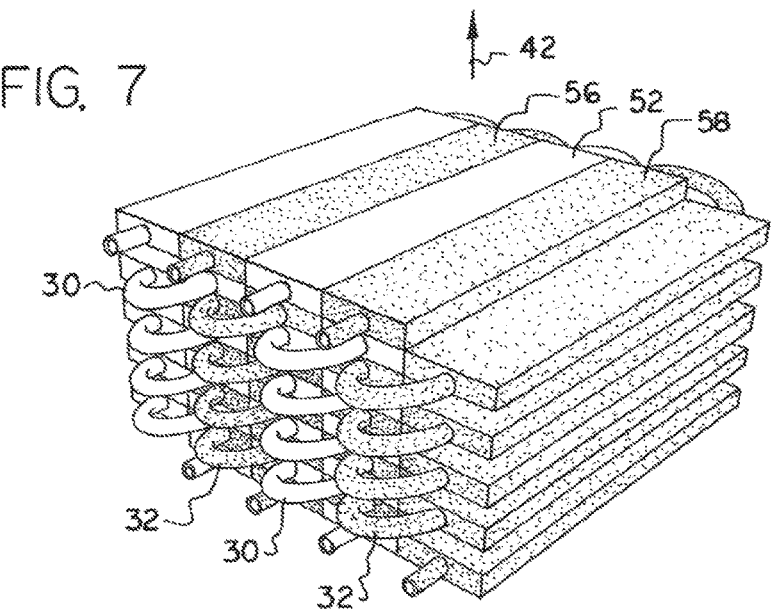
Figure 5:
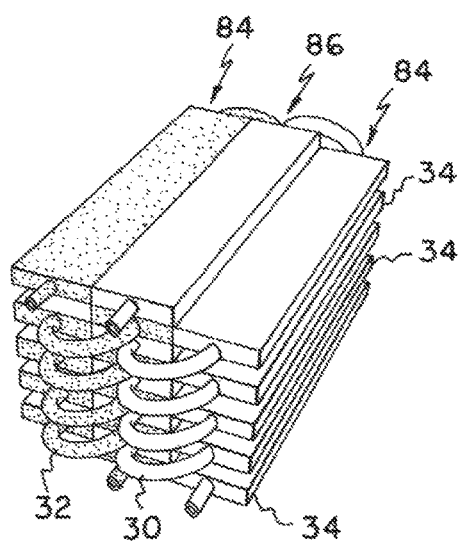

FIG. 5 depicts the two helical flow paths 30 and 32 brought together to form overlapping flow paths, wherein flow path 30 is through passages 34 in stack 86 and in the adjacent stack 84 to the left, while flow path 32 is through the alternate passages 34 in stack 86 and in passages in another adjacent stack 84 to the right, i.e., a partial overlapping of flow paths 30 and 32. FIG. 7 illustrates a larger assembly of the flow path structure of the present invention in a configuration with any number (4 illustrated) partially overlapping helical flow paths 30 and 32. This is of course illustrated solely for illustrative purposes and should not be considered limiting of the invention, as it is clear that any number of helical flow paths of any length as determined by the passage lengths and the number of passages 34 may be used.

With the bounding walls of the passages 34 in contact, or more practically being formed to share bounding walls, heat transfer may be established between the flows carried by each of them. Thus, referring to the illustration of walls in FIG. 3B and the two vertically stacked adjacent upper and lower ducts, illustrated at 52 and 54 respectively in FIG. 7, and the ducts 56 and 58 adjacent and to the sides respectively of duct 52, it can be seen that the lower wall 46 of duct 52 is the upper wall 44 of duct 54 and that the side walls 48 of duct 52 are the adjacent side walls 48 respectively of the adjacent ducts 56 and 58 respectively to the sides thereof. Thus, it can be seen that each passage 34 shares common walls with its adjacent passages 34 in what may be called a honeycomb formation or structure.

While the ducts 34 are illustrated herein to have four walls (rectangular in cross-section), it should be understood that they may have any other suitable number of walls, for example, three (triangular in cross-section) or five or more (polygonal in cross-section). For the purposes of this specification and the claims, a structure wherein each of a plurality of flow passages or ducts has three or other suitable number of walls with each wall of one duct being a wall of an adjacent duct is defined herein as being a honeycomb structure, i.e., adjacent ducts share common walls. Such a honeycomb structure may be manufactured as a single integral unit or, as hereinafter discussed, manufactured by attaching a plurality of plates or by other suitable method of manufacture. If it is formed by connecting a wall of one duct to a wall of an adjacent duct, the two connected walls may be said to be a common wall shared by the adjacent ducts.

Figure 6:
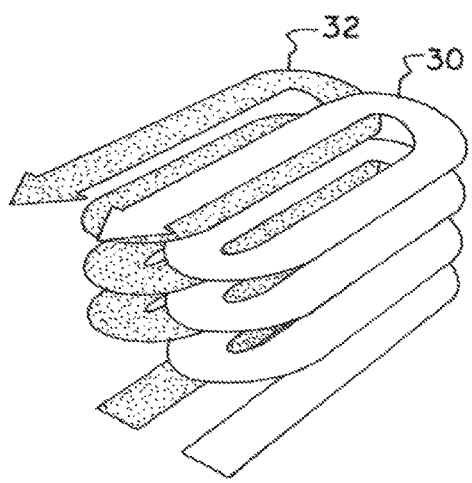

FIG. 6 illustrates the topological relationship between the two helical flow paths 30 and 32, in particular with respect to the way the flows overlap each other as they traverse the partially overlapping circuits, i.e., flow paths.

FIGS. 8A and 8B illustrate what may be called "chess-board or checker-board patterns" established by the different working flows (corresponding to helical flow paths 30 and 32 respectively) at any cross section of the passages 34. The large arrows represent the working flows and their direction of motion within a given passage 34. If, for illustrative purposes and in accordance with the convention being used herein, the flows 30 are assumed to be of a hot fluid and the flows 32 are assumed to be of a cold fluid, the heat flux directions (i.e., directions of heat transfer or flow of heat energy) represented by the small arrows 60 normal to the bounding surfaces or walls 44, 46, and 48 are established. When the flows in two adjacent passages are in opposite directions, as illustrated by the large arrows pointing in opposite directions, there is counter-flow. When the flows in two adjacent passages are in the same directions, as illustrated by the large arrows pointing in the same directions, there is co-flow. Thus, in FIG. 8A there is illustrated counter-flow heat exchange across the horizontal bounding walls 44 and 46 and co-flow heat exchange across the vertical walls 48. It should be noted that 44 and 46 depict the same wall, i.e., the lower wall of one passage and the upper wall of the passage above. In FIG. 8B, there is illustrated counter-flow heat exchange across the vertical bounding walls 48 and co-flow heat exchange across the horizontal walls 44 and 46.

The heat exchanger so far discussed, as illustrated in FIGS. 3 to 7, may be said to have a block form, i.e., each of the passages starts on one side of the block and ends on the other side of the block. More specifically, it may be said to be hexahedron-shaped, but the shape of the heat exchanger may be any other suitable shape, such as described hereinafter.

FIG. 9B illustrates schematically an embodiment of a heat exchanger in accordance with the present invention in a radial configuration, which may be called doughnut-shaped or torus-shaped, wherein flow is in a radial direction, illustrated at 62, toward and away from the geometric axis, illustrated at 64, thereof, wherein each passages extends between a radially inner terminus and a radially outer terminus. The principle is the same as in the previously discussed block form, with passages 34 arranged adjacent to each other and interconnected at their ends in such a manner as to establish helical overlapping flows, similarly as previously discussed, across similar walls 44, 46, and 48. In order to complete the construction of the heat exchanger, as discussed hereinafter, a closure plate would be attached to the top and bottom. The radially inner and outer boundaries (as well as similar end boundaries for a parallel heat exchanger), illustrated at 66 and 68 respectively, are referred to herein and for purposes of the claims as terminals and comprise suitable means such as closure barriers or walls for closing or sealing the boundaries.

FIG. 9A illustrates an exemplary (and of course not limiting) manner in which the ducts 34 may be assembled, arrayed into individual trays or platters or plates, illustrated generally at 70, and stacked upon each other with their vertical walls 48 (side walls) aligned, and interconnected at their ends as well as along the aligned vertical walls 48 in a suitable manner such as (but not limited to) welding to join a plurality of the plates 70, such as illustrated in FIG. 9B (5 plates 70 shown joined), to form the helical passages. The number of segments, i.e., ducts per plate, i.e., the passage or duct pitch, is arbitrary, so long as it is desirably an integral multiple of the number of working flows (for example, 24 ducts per plate for two working flows). The lengths of the ducts 34, from ID to OD (from inner diameter to outer diameter or from inner terminus 66 to the outer terminus 68) is determined according to the application requirements. The number of plates 70 is also determined by the heat exchange requirements. The mean aspect ratio of a passage, i.e., the ratio of the average width of a upper/lower wall 44/46 to the average height of a side wall 48, is determined as a function of the flow rate/pressure drop and heat exchange requirements of the application, in accordance with the hereinafter discussion.

FIG. 10 illustrates a preferred method of incorporating the passage interconnections into the passage walls and floors 44, 46, and 48 to establish the radially-oriented helical flows. For this configuration, two types of plates 70, illustrated generally at 72 and 74 respectively, are provided, one 72 with vertical wall offsets 76 from the respective passage such as by bends and with lower wall openings 78 (provided within confines of the offsets 76 so that the fluid flow is guided into the openings 78 by the boundary provided by the offsets 76 and discussed in greater detail hereinafter) on the ID (inner diameter) side of the passage, i.e., adjacent the radially inner terminus 66. For the other plate 74, the offsets 76 and openings 78 are provided on the OD (outer diameter) side of the passage, i.e., adjacent the radially outer terminus 68. The offsets 76 may be curved or otherwise suitably shaped. Alternating the type of passage arrays (plates or trays, i.e., plate 72, then plate 74, then plate 72, then plate 74, etc.) is provided to complete the helical flow paths 30 and 32, as discussed in greater detail with respect to FIGS. 11 to 13 and 20 to 25 of the drawings. In this preferred configuration, interconnecting openings 78 of large hydraulic diameter can be attained, thereby to produce minimum pressure losses at the passage junctions, i.e., adjacent the terminals 66 and 68. Many methods are envisioned for creating these geometric elements, including casting, mechanical material removal and brazing/welding of trays, assembly from folded, formed or cut foils, or additive manufacturing techniques like metal sintering and ceramic printing. However, the manner of manufacturing should not be considered as limiting the scope of the invention, which is defined by the claims.

Figure 11:
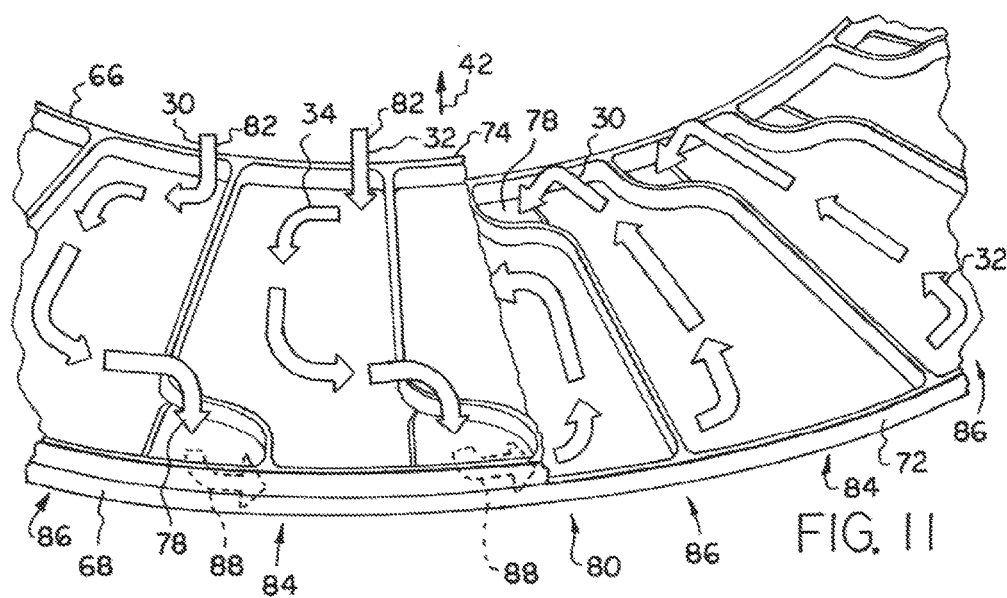

FIG. 11 illustrates by arrows the helical flow patterns in an exemplary heat exchanger of the present invention, wherein the heat exchanger is comprised of the vertical or side walls 48 with the guiding bends 76 and the internal interconnecting openings 78. It should be noted that plates 72 and 74 are illustrated with the upper plate 74 broken away at 80 to more clearly illustrate flow radially in both plates and vertically from one plate to the other. It can be seen therein that on a given level, with the vertical walls 48 aligned (except at their bends 76), a cool flow passage 32 lies on top of a hot flow passage 30, and that any given bend 76 and opening 78 turns the flow and forces it to continue through the helical pattern, i.e., to cause the fluid to flow downwardly to the below plate and into the adjacent passage in the below plate. As previously discussed, there are of course other methods of completing the helical flow patterns.

Figure 20:
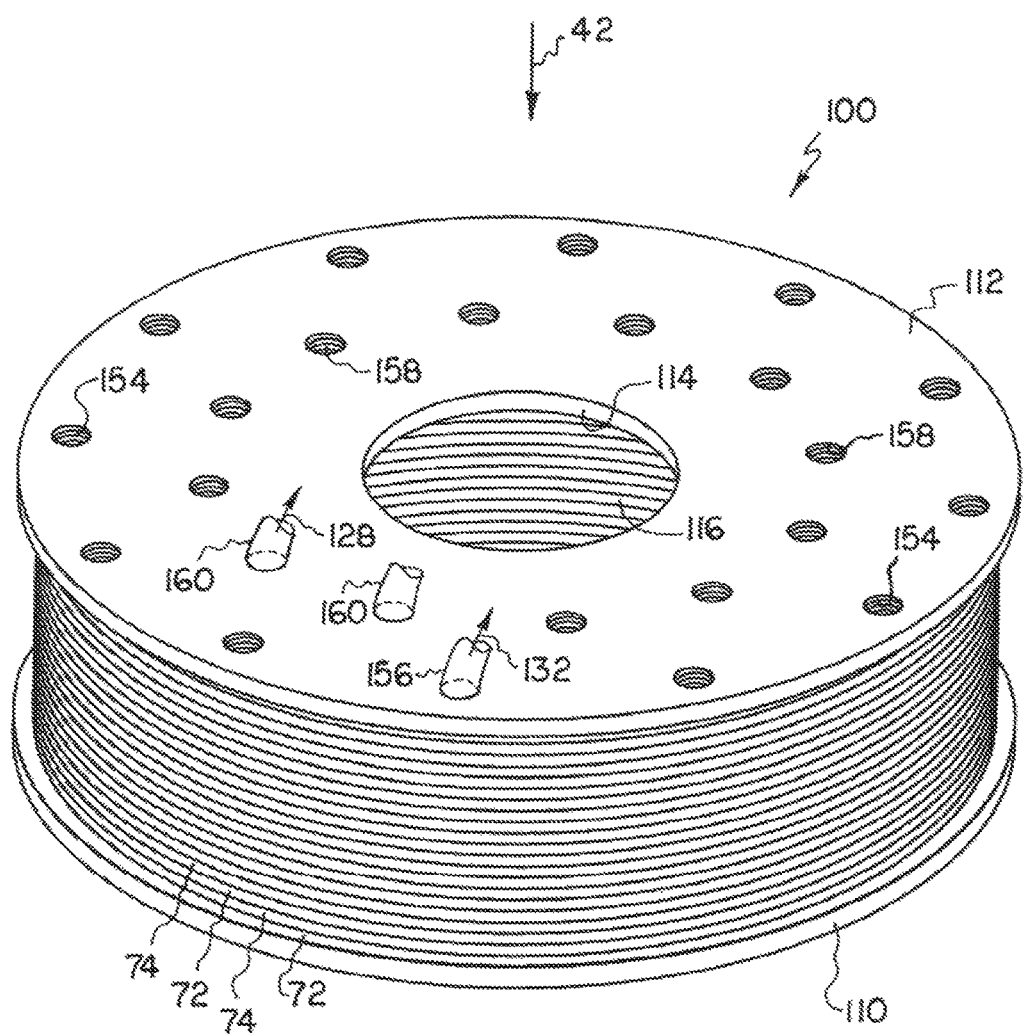
FIG. 20 is a perspective view of a series of discs for forming flow passages for a heat exchanger in accordance with the present invention, with end plates attached.

A heat exchanger, shown generally at 100 in FIG. 20 (with the flow inlet and outlet manifold 120 of FIG. 27 removed for purposes of clarity of illustration) may comprise any suitable number of the pairs of plates 72 and 74 with the major portions 82 of the side walls 48 being horizontally aligned (i.e., one directly over the other) and the side walls 48 being sealingly attached to the above plates respectively such as, for example, by welding. A "major portion" of a side wall 48 is meant to refer, for the purposes of this specification and the claims, to that portion of a sidewall which is exclusive of its offset portion. An "offset portion" of a side wall 48 is meant to refer, for the purposes of this specification and the claims, as a curved or bent portion of a side wall 48 at/adjacent a terminus of a heat exchanger which is offset or curved or bent around an opening for passing fluid to a lower passage in an adjacent stack of passages. It should of course be understood that, if the passages are externally flow connected such as with external tubes so that there are no offset portions 76, then a major portion is equal to the entire length of a side wall 48.

The flow paths 30 and 32 may be more particularly described as follows. Flows are downwardly from upper to lower plates alternately to plates 72 and 74, i.e., from a plate 72 to a plate 74 to a plate 72 to a plate 74, etc. In FIG. 11, flow is illustrated as being from an upper plate 72 (not shown) to the adjacent below plate 74, as indicated by arrows 82, for both hot and cool flow paths 30 and 32 respectively. In each plate, the passages are alternately hot fluid flow passages and cool fluid flow passages around the circumference of the heat exchanger 100, depending on whether a particular passage is in the hot or cool fluid flow path 30 or 32 respectively.

In a preferred type of flow path arrangement, the passages are arranged around the circumference of the heat exchanger 100 into a plurality of pairs of vertical groups or stacks of passages, i.e., a first group being illustrated at 84 and a second group at 86 (better seen in FIG. 5). Thus, each group includes all of the vertically stacked passages at a particular circumferential location, i.e., there are illustrated to be 10 vertically stacked passages 34 in group 86 in FIG. 5. From radially inner openings 78 in an upper plate (not shown in FIG. 11), the hot and cool fluid flows are received in the radially inner ends of laterally adjacent passages, as indicated by generally vertical arrows 82 respectively, in plate 74 then flow radially outwardly through the respective passages 34 in plate 74 and in vertical groups 86 and 84 respectively. Then there are brief flows circumferentially, as illustrated by dashed arrows 88, in what may be called cross-flow, and downwardly through the respective radially outer openings 78 into respective passages 34 which are in the adjacent below plate 72 and which are offset circumferentially (to the right as seen in FIG. 11) into the other respective adjacent vertical group, i.e., now vertical group 84 for the hot fluid flow path 30 and vertical group 86 for the cool fluid flow path 32. The flow continues in the respective adjacent offset passages of plate 72 radially inwardly to the respective radially inward openings 78 where there is again brief cross-flow and flow vertically downwardly into the respectively adjacent passages which are in the adjacent below plate (not shown in FIG. 11) and which are offset circumferentially (back to the left as seen in FIG. 11) into the respective former adjacent vertical group, i.e., vertical group 86 for the hot fluid flow path 30 and vertical group 84 for the cool fluid flow path 32, wherein the flow is again radially outwardly through these new vertically lower passages, and the flow continues in this manner from the upper to the lower of the passages, i.e., vertically downwardly through the heat exchanger 100 in a helical pattern.

It can thus be seen that, for the hot fluid flow path 30, there is flow in alternate passages of the vertical group 84 and in alternate passages of the adjacent vertical group 86 and likewise for the cool fluid flow path 32, with the result that there is alternately hot and cool fluid flow through the vertically arrayed passages of each vertical group, as can be visualized from FIG. 11, which provides counter-flow to allow maximized heat transfer to occur across walls of maximized size which also provide maximized hydraulic diameter passages for minimization of pressure drop. It can thus be seen that there is alternately hot and cool fluid flow through the circumferentially arrayed passages of each plate, as can be seen by the arrows in FIG. 11, for maximizing heat transfer. Thus, each of the flow paths 30 and 32 may be said to spiral downwardly between two groups of passages like a spiral staircase or in what is referred to herein, for the purposes of this specification and the claims, as helical or screw thread-like flow paths. It can be readily appreciated that the combination of heat transfer and pressure drop can be advantageously tailored by one of ordinary skill in the art to which the present invention pertains by varying the areas of the horizontal walls 44, 46 and the heights of the vertical walls 48 (as well as varying the flow paths themselves) to achieve a desired maximization of heat transfer at a desired minimized pressure drop.

Referring to FIG. 20, there is shown generally at 100 the heat exchanger (with the fluid inlet and outlet manifold 120 of FIGS. 27 and 28 removed for purposes of clarity of illustration) in accordance with the present invention, which is considered suitable for functioning as a Brayton Cycle gas turbine recuperator, illustrated at 100 in FIG. 20, but the present invention should of course not be construed as limited to this embodiment.

Figure 19:
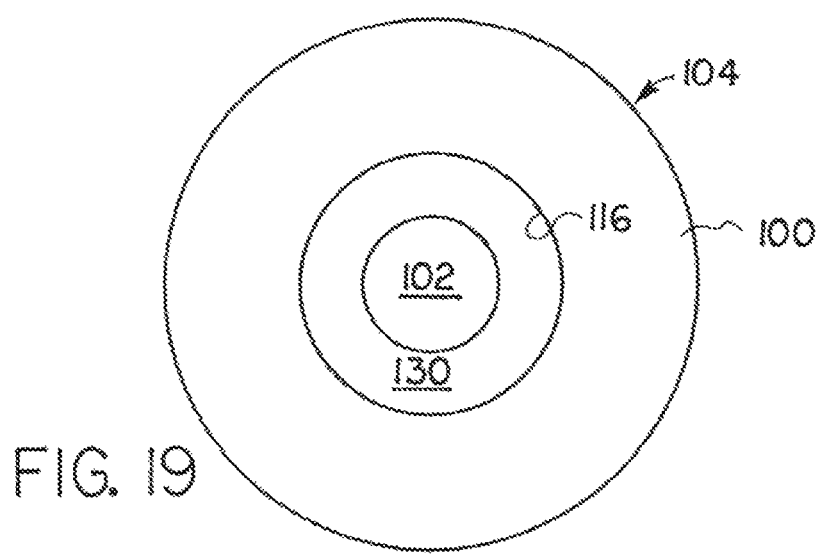
FIG. 19 is a schematic illustration of the end view of the gas turbine engine, taken along lines 19-19 of FIG. 17.
Figure 18:
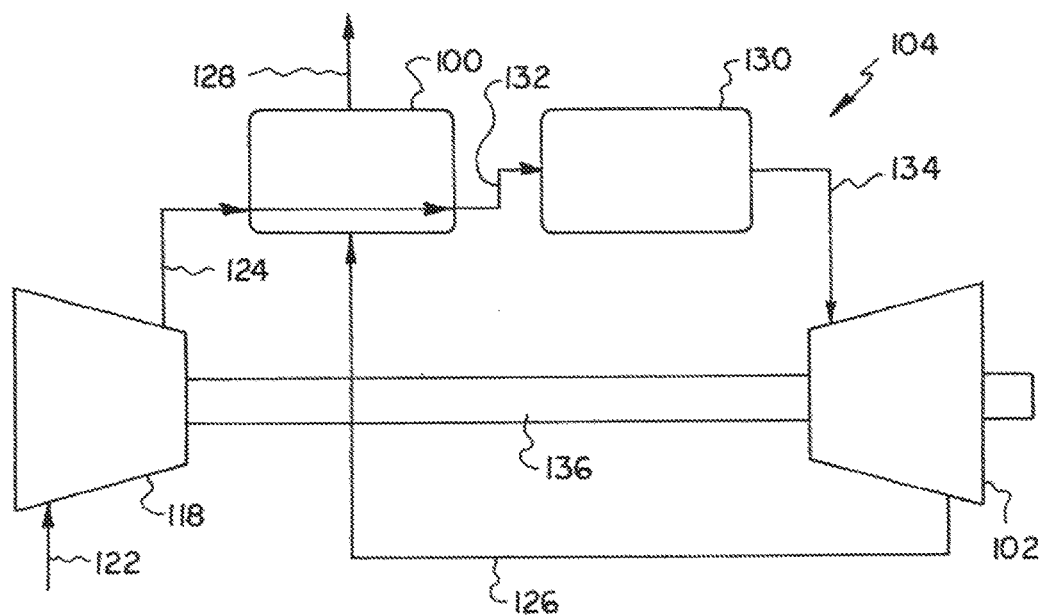
FIG. 18 is a schematic illustration of the flow paths through the gas turbine engine.

A gas turbine engine 104 utilizing a recuperator 100 (heat exchanger) for recovering exhaust heat from the gas turbine 102 is illustrated in FIGS. 17 to 19. The recuperator heat exchanger 100 is illustrated to have a plurality of, for example, about 20 plates which are alternately plates 72 and 74 which are welded or otherwise suitably sealingly attached so that the major side wall portions 82 are aligned as previously discussed. In addition, terminal bands or walls 106 and 108 (FIGS. 21 and 24) are suitably formed or otherwise suitably sealingly provided circumferentially around the radially inner and outer edges or terminals 66 and 68 respectively of the plates 72 and 74 and the bands of the plates welded or otherwise suitably sealingly attached to each other respectively so that the fluids are bounded or contained within the heat exchanger 100 so that they do not escape. The widths of these bands are desirably equal to the widths of the side walls. Axially inner and outer flanges 110 and 112 are welded or otherwise suitably sealingly attached to the axially inner-most and outer-most of the plates to also maintain the fluids contained within the heat exchanger 100. Each flange 110 and 112 desirably has the shape, in plan view, of a plate, with a central hole, illustrated at 114, which desirably corresponds to the central openings (radially inner terminals) of the plates, with the result that the heat exchanger is generally doughnut shaped with a central cylindrical hole centrally thereof, as seen at 116, in FIGS. 17, 19, and 20.

The heat exchanger 100 is desirably composed of a super alloy such as, for example, Inconel alloy, which is a commercially well known high chromium nickel which is capable of withstanding high gas turbine exhaust temperatures in the range of up to about 1200 degrees F., or Rene 41 alloy which is a commercially well known nickel-based alloy capable of withstanding high gas turbine exhaust temperatures in the range of up to about 1800 degrees F.

Referring to FIGS. 17 and 18, the gas turbine engine 104 has an air compressor (or other fluid compressor) 118 which receives ambient air or other fluid, as illustrated at 122, wherein the air is compressed and discharged to the recuperator heat exchanger 100, as illustrated at 124. Exhaust from the gas turbine 102 is also discharged to the recuperator 100, as illustrated at 126. Otherwise wasted heat from the gas turbine exhaust is recovered in the recuperator by heat exchange with the compressed air thereby heating and thus adding energy to the compressed air, and the spent gas turbine exhaust is released from the recuperator, as illustrated at 128. The heated compressed air is then routed to a combustor 130, as illustrated at 132, where it is used in burning a fuel. The gas produced in the combustor 130 is routed to the turbine 102, as illustrated at 134, to provide energy for driving the turbine 102. The turbine 102 is coupled to the compressor 118, as illustrated schematically by shaft 136, for driving the compressor 118.

As can be seen in FIGS. 17 and 19, the combustor 130 is received within the hole 116 of the recuperator heat exchanger 100 so that the inside wall 116 of the heat exchanger 100 wraps around the turbine engine combustor 130 so that heat escaping the combustor by means other than the exhaust will desirably also soak through the recuperator 100, to thereby make more heat available for transfer to the compressor discharge 124, for thereby achieving increased efficiency.

Figure 21:
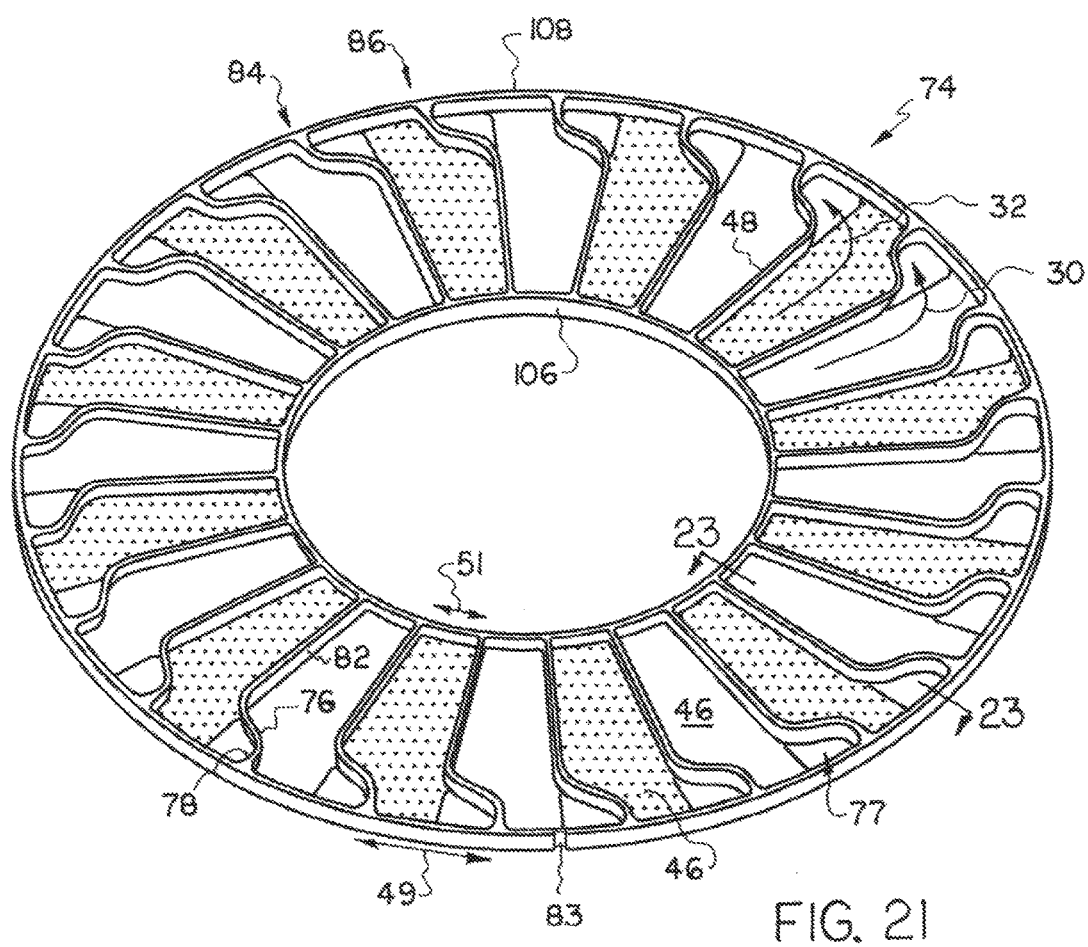
FIG. 21 is a perspective view of a disc of a first type for the series of discs of FIG. 20 and showing one side thereof in which flow passages are formed.
Figure 22:
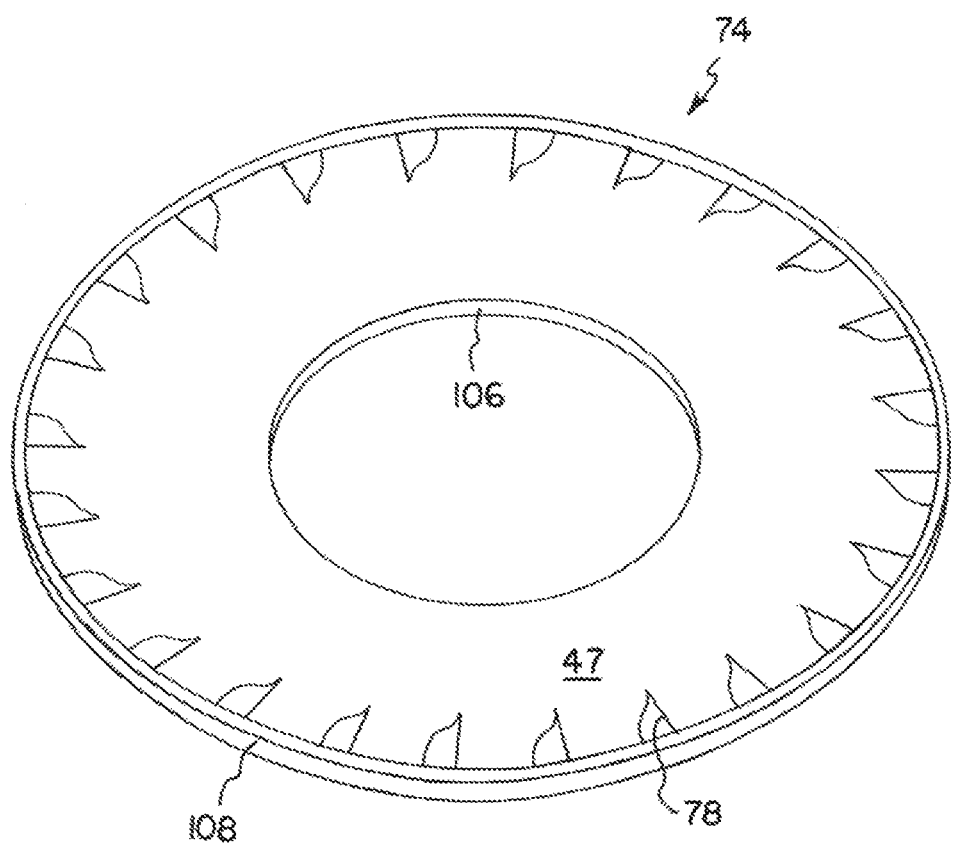
FIG. 22 is a perspective view of the disc of FIG. 21 and showing the other side thereof.
Figure 23:
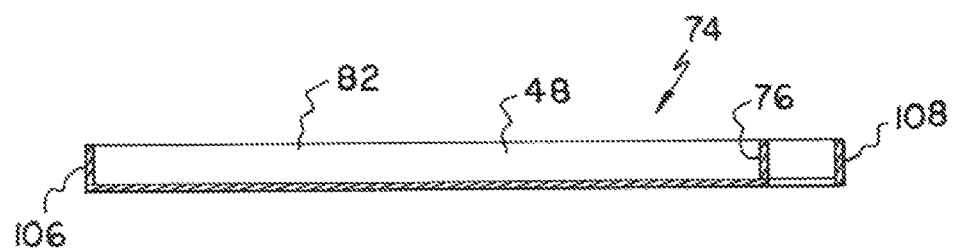
FIG. 23 is a sectional view of the disc taken along lines 23-23 of FIG. 20.

Referring to FIGS. 21, 22, and 23, there is shown a preferred plate 74, with, for purposes of illustration, alternate passages 34 for the hot flow paths 30 being un-stippled and the alternate passages 34 for the cool flow paths 32 being stippled, it being understood that the stippled passages could be for the cool flow paths 32 and the un-stippled passages could be for the hot flow paths 30 and it being further understood that whether a particular passage is for a relatively hot flow path or a relatively cool flow path will depend on the particular application requirements. Since the passages are identical in size, it doesn't matter, but it should be understood that the passages may be differently sized in accordance with design requirements. In the assembled heat exchanger 100 with alignment of the side wall major portions 82, the passages for the hot flow paths 30 are each part of a first group or stack 84 (one in each plate), and the passages for the cool flow paths 32 are each part of a second group or stack 86 (one in each plate). It can be seen that the flow paths 30 and 32 for all the passages are in the same direction in plate 74 thus providing co-flow across the side walls 48. It can of course be seen that vertically the flow paths 30 and 32 in a passage and in an adjacent upper or lower passage are in opposite directions thus providing counter-flow across the lower walls 46 as well as the upper walls 44 (between a passage and its adjacent passage below as well as its adjacent passage above in its group) thus providing counter-flow across the horizontal walls 44 and 46. It can be seen that the bottom side (FIG. 22) of the plate 74 is flat, i.e., to define a planar floor 45 from which the side walls 48 extend upwardly and extend radially between the terminals 106 and 108, with the upper and lower walls 44 and 46 for the passages 34 defined as portions of the floor 45 between the side walls 48.

Figure 26:
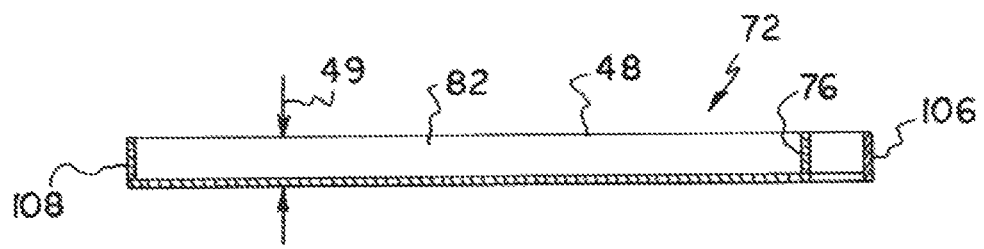
FIG. 26 is a sectional view of the disc of FIG. 24 taken along lines 26-26 of FIG. 24.
Figure 24:
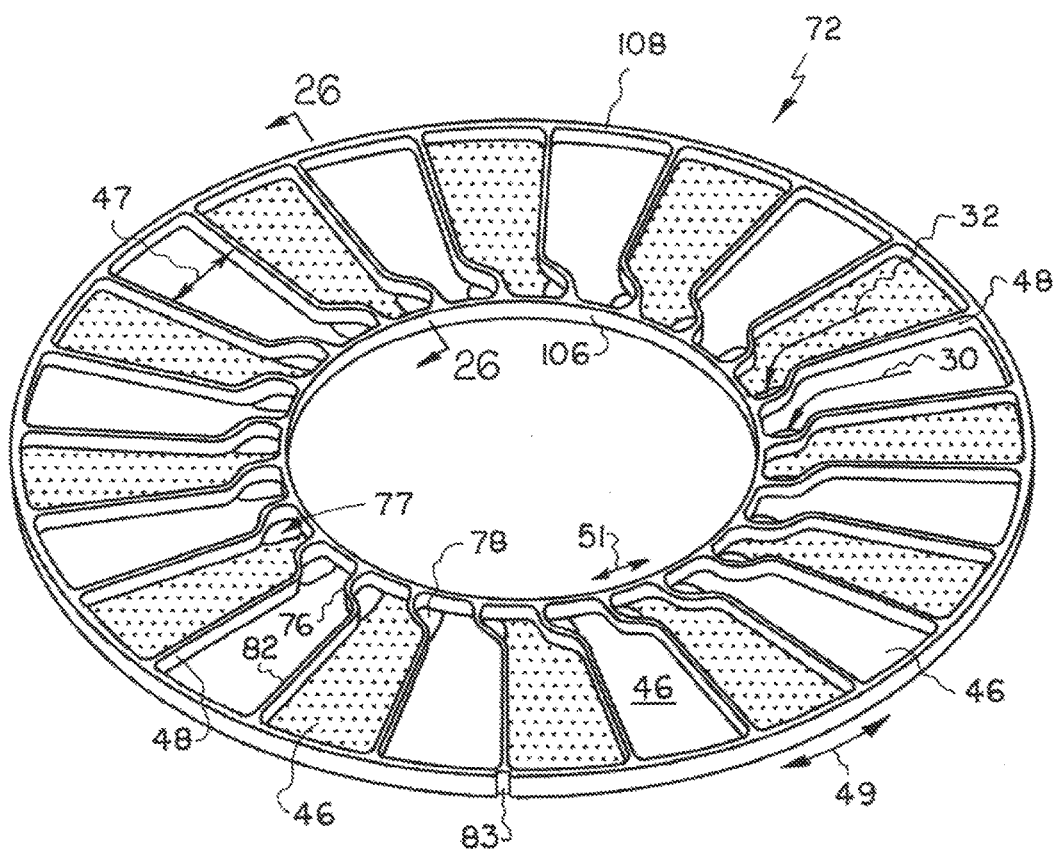
FIG. 24 is a perspective view of a disc of a second type for the series of discs of FIG. 20 and showing one side thereof in which flow passages are formed.
Figure 25:
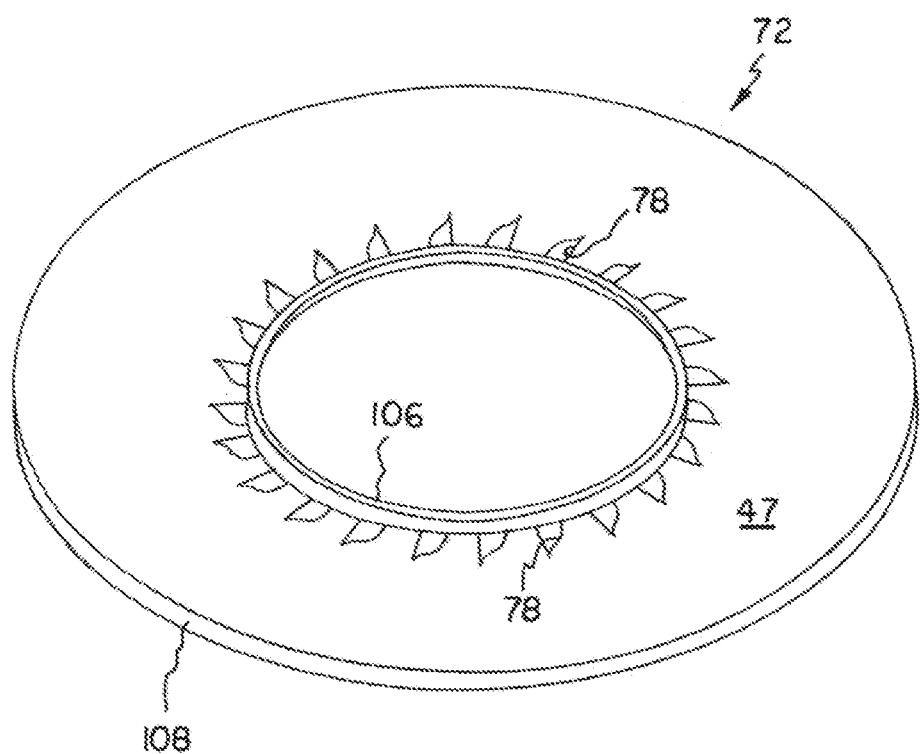
FIG. 25 is a perspective view of the disc of FIG. 24 and showing the other side thereof.

Referring to FIGS. 24, 25, and 26, there is shown a preferred plate 72 which is similar to plate 74 except that the openings 78 are adjacent the inner terminus 106. Similarly, for purposes of illustration, alternate passages 34 for the hot flow paths 30 being un-stippled and the alternate passages 34 for the cool flow paths 32 being stippled, it being understood that the stippled passages could be for the cool flow paths 32 and the un-stippled passages could be for the hot flow paths 30 and it being further understood that whether a particular passage is for a relatively hot flow path or a relatively cool flow path (and the particular sizings of the passages) will depend on the particular design requirements of a heat exchanger. In the assembled heat exchanger 100 with alignment of the side wall portions 82 (aided by notches 83 to provide the desired preciseness of alignment), the passages for the hot flow paths 30 are each part of a first group or stack 84 (one in each plate), and the passages for the cool flow paths 32 are each part of a second group or stack 86 (one in each plate). It can be seen that the flow paths 30 and 32 for all the passages are in the same direction in plate 74 thus providing co-flow advantageously across the minimized area side walls 48. It can of course be seen that vertically the flow paths 30 and 32 in a passage and in an adjacent upper or lower passage are in opposite directions thus providing counter-flow advantageously across the maximized area lower walls 46 as well as the upper walls 44 (between a passage and its adjacent passage below as well as its adjacent passage above in its group) thus providing counter-flow across the horizontal walls 44 and 46. It can be seen that the bottom side (FIG. 25) of the plate 72 is flat, i.e., to define upper walls 44 for the passages in the plate 72 below it.

Figure 27:
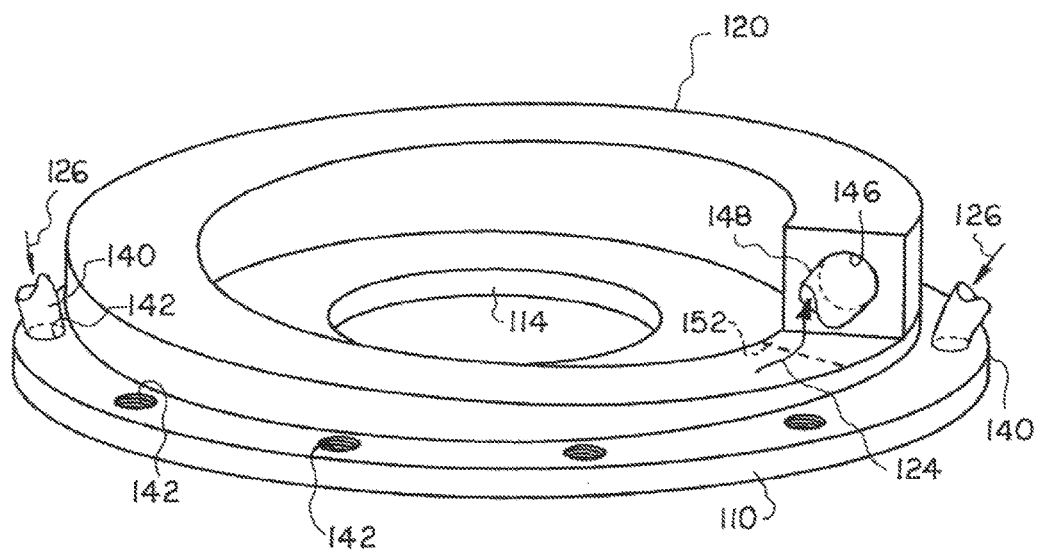
FIG. 27 is a perspective view of a gas flow manifold for the heat exchanger of FIG. 20 attached to one of the end plates.
Figure 28:
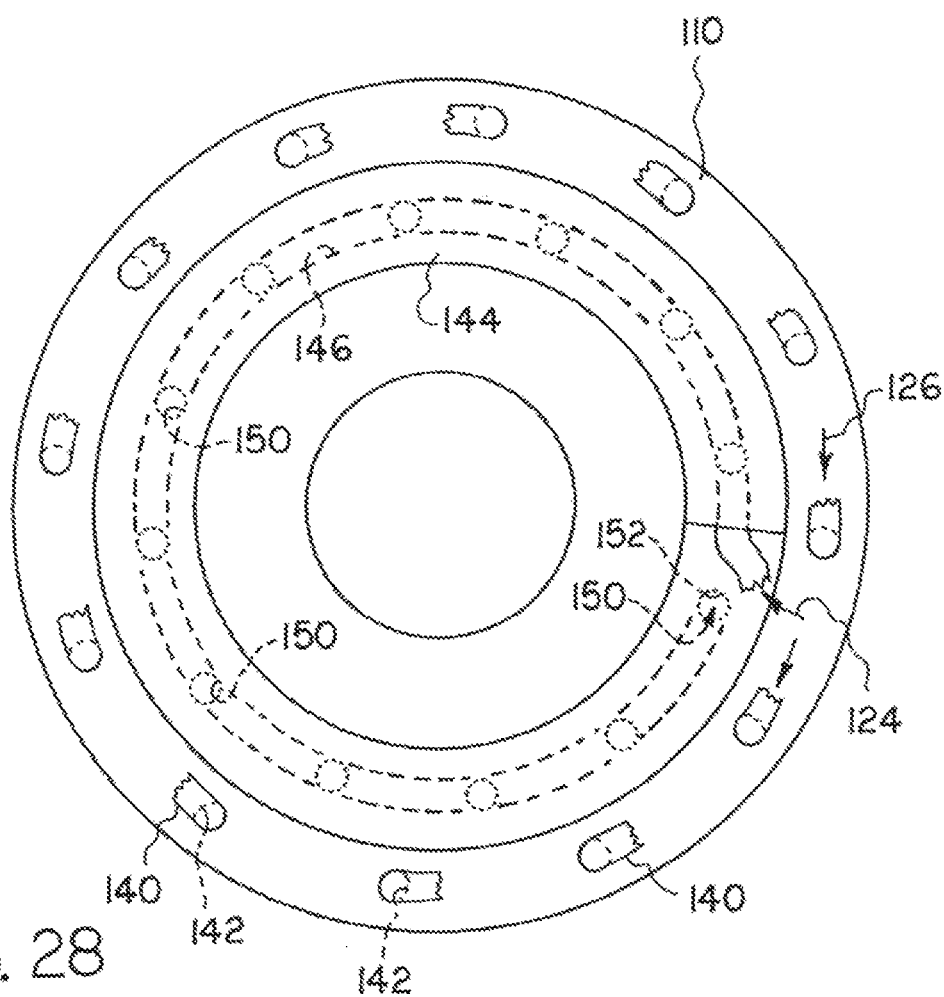
FIG. 28 is a plan view of the manifold and end plate of FIG. 27.

Referring to FIG. 27, hot exhaust 126 from the turbine 102 is flowed through a plurality of tubes, illustrated schematically at 140, or other suitable conduits or flow routing devices through respective apertures, illustrated at 142, spaced circumferentially around the flange 110 adjacent the perimeter thereof. These apertures 142 are spaced to open into and communicate with and open into alternate passages in the upper ones of the plates, which alternate passages will accordingly be considered to be hot passages for the circumferentially-spaced hot flow paths 30. Note that the apertures 142 are shown to be threaded for receiving threaded ends of the tubes 140. However, the tubes 140 may be otherwise suitably sealingly connected to the apertures 142 or a manifold (similar to manifold 144 discussed hereinafter) may be used instead.

Welded or formed integrally with or otherwise suitably sealingly connected to the flange 110 is a radially intermediate circumferentially-extending manifold or volute 144 having a passage, illustrated at 146, which extends over the length circumferentially of the manifold to a closed end at 152 and the inlet of which is threaded or otherwise suitably adapted for sealingly receiving a tube, illustrated schematically at 148, or adapter or other suitable device for routing flow 124 of the compressed air into the manifold 144. In the passage 146, the compressed air is distributed through circumferentially-spaced apertures, illustrated at 150, which pass entirely through the flange 110 (or, if the flange is a separate piece, then flow-connect with similar apertures in the flange) and open into alternate passages in the upper ones of the plates, which alternate passages will accordingly be considered to be cool passages for the circumferentially-spaced cool flow paths 32. The apertures 142 and 150 are seen as alternately spaced circumferentially so that the turbine exhaust and compressed air flows are received in alternate passages in the upper plate, which is seen in FIG. 20 to be plate 72. Since the apertures 142 and 150 are shown as positioned toward the radially outer periphery of the flange 110, it is considered more suitable that the upper plate be plate 72 having the openings 78 radially inwardly thereof. If the apertures 142 and 150 were positioned toward the radially inner periphery of the flange 110, it may be considered more suitable that the upper plate be plate 70 having the openings 78 radially outwardly thereof. Similar considerations are applicable for the hereinafter discussed exhaust flows 128 and 132. Though the passage 146 is only illustrated schematically in FIG. 28, as apparent in FIG. 27, the cross-sectional size of the passage 146 is suitably formed to gradually decrease over its length so as to maintain consistent pressure and velocity for delivery of the compressed air to all of the passages 34, thereby to maintain effectiveness of heat transfer throughout all of the passages 34 of the heat exchanger. A similar manifold could be devised for routing the turbine exhaust into the heat exchanger, replacing the tubes 140. Thus, for example, concentric manifolds may be provided each feeding alternate holes, one for one flow path and the other for an other flow path.

Referring again to FIG. 20, the lower flange 112 (note that the arrow 42 shows the upward direction to be downwardly in FIG. 20, the upper direction as previously discussed being an arbitrary direction which allows other spacial relationships to be related thereto) has a plurality of circumferentially-spaced threaded apertures, illustrated at 154, adjacent the outer periphery for receiving and discharging the heated compressed air 132 from the alternate passages 34 for the cool flow path 32 to the combustor 130, via tubes 156 having threaded ends/adapters to sealingly threadedly engage the threaded apertures 154 respectively, or the heated compressed air may be discharged from the apertures by other suitable means, for example, a manifold, similarly as discussed for manifold 144. The lower flange 112 also has a plurality of radially-intermediate circumferentially-spaced threaded apertures, illustrated at 158, for receiving and discharging the spent turbine exhaust 128, via tubes 160 having threaded ends/adapters to sealingly threadedly engage the threaded apertures 158 respectively, or the spent turbine exhaust 128 may be discharged from the apertures 158 by other suitable means, for example, a manifold, similarly as discussed for manifold 144. Thus, similarly as for the upper flange 110, the lower flange 112 may also be fitted with concentric manifolds for the respective gas flows. The apertures 154 and 158 are seen as alternately spaced circumferentially so that the heated compressed air 132 and the spent turbine exhaust 128 are received from alternate passages in the lower of the plates.

While a manifold 120 is shown to be provided only for the distribution of the compressor discharge 124 into the heat exchanger 100 and while tubes are shown for distribution of other flows to and from the heat exchanger, it should be understood that a similar manifold may be provided for one or more of distribution of flows 126 and collection of outlet flows 128 and 132. Conversely, a series of tubes may be provided instead of manifold 120 for delivery of flows 124.

While they may be formed in various ways, the plates 72 and 74 may desirably be milled via computer numerical control or CNC and then stacked and oven brazed or welded to each other in an alternating manner, completing the passages. For example, the radially inner walls 106 may be welded to each other, the radially outer walls 108 may be welded to each other, and the side walls 48 may be brazed to the adjacent plates above respectively. A notch, illustrated at 83, is desirably provided in the radially outer perimetric wall 108 of each plate 72 and 74 in alignment with a major side wall portion 82 so as to aid in aligning the major side walls 82 for attaching the plates 72 and 74.

The testing hereinafter discussed with reference to FIGS. 14, 15, and 16 utilized a prototype heat exchanger built in accordance with the embodiment hereinbefore discussed with reference to FIGS. 20 to 28 and placed in a gas turbine engine as discussed hereinafter with reference to FIGS. 17, 18, and 19. During running of the gas turbine engine, gas temperatures were recorded, and experimental effectiveness values were derived. In the graphs, an "x" represents an experimental datum, an "o" (or circle) represents a mean of a plurality of experimental data, and a vertical line through an "x" or "o" represents standard deviation. The heat exchanger 100 had 20 plates 72 and 74 alternately arranged, each plate having 24 passages 34 and having similar sizing as hereinafter discussed. Each plate 72 and 74 had an inner diameter of about 8⅞ inches and an outer diameter of about 17⅛ inches. Each inner and outer wall 106 and 108 respectively of each plate 72 and 74 had a thickness of about 1/16 inch. Each of the walls 46 and 48 of each plate 72 and 74 is desirably suitably thin to provide effective heat transfer and, in accordance therewith, had a thickness of about 1/32 inch (or may be even less than 1/32 inch).

The two competing considerations in the design of a suitable heat exchanger are the effectiveness of heat transfer and the minimization of pressure drop.

The amount of heat transfer is related to the areas of walls bounding counter-flow as well as the areas of walls bounding co-flow. If the lengths of the passages are constant as in the heat exchanger 100, then the amount of heat transfer is related to the average widths of walls 46 and 48.

Pressure drop is related to the sizes of the passages, i.e., the hydraulic diameters of the passages as well as of the openings or otherwise connections between passages, the larger the hydraulic diameters the lesser the pressure drop. With the average width of wall 46 being designated a and the average width of wall 48 being designated b, the hydraulic diameter of a rectangular in cross-section passage is defined by the formula 2ab/(a+b). If the passage is square in cross-section, using the above formula, the hydraulic diameter is equal to the average width of one of the sides.

Without wishing to be bound by theory here or elsewhere in this specification, heat transfer coefficients and pressure drop both reduce as the hydraulic diameter increases. Therefore, a large hydraulic diameter is good for pressure drop but bad for heat transfer. By making the passages with a large aspect ratio (ratio of average width of the wider wall such as the upper/lower wall width in heat exchanger 100 to the average width of the narrower wall such as the average side wall height in heat exchanger 100), you create a large hydraulic diameter but compensate the reduction of heat transfer coefficient by increasing the areas over which counter flow heat exchange occurs.

As seen in the drawings, the widths of the upper/lower walls 46 (across which there is counter-flow) are very large compared to the heights of the side walls 48. The reason for this may best be understood with the following hypothetical (wherein the numbers are approximate calculations, and the wall widths and heights are average widths and heights).

| Wall 46 width | Wall 48 height | Hydraulic diameter |
|---|---|---|
| 10 | 10 | 10 |
| 4 | 4 | 4 |
| 4 | 1 | 1.6 = approx. 2 |
| 8 | 1 | 1.8 = approx. 2 |
| 100 | 1 | 2.0 = approx. 2 |
| 400 | 1 | 2.0 = approx. 2 |

It can be seen from the above that an increased hydraulic diameter can result from an increased wall height, but at the expense of the heat exchanger being larger and heavier so that it may not meet the objective of providing a portable engine. When minimizing the wall height relative to the wall width, there is some decrease in hydraulic diameter. However, at an acceptably minimized wall height to achieve an acceptably minimized pressure drop, the above shows that the wall 46 width may be maximized to achieve a maximized heat transfer effectiveness with a sufficiently small wall 48 height to achieve a desirably minimized pressure drop as well as a minimized weight and size of the heat exchanger.

The same principles apply if it is the wider (upper/lower) walls that are subject to co-flow, as seen in FIG. 8B.

Depending on system requirements and how much pressure drop can be tolerated in relation to what rate of heat transfer is desired, the desired sizing of the walls 46 and 48 will vary as well as the particular arrangement of flow paths 30 and 32. For the prototype heat exchanger 100, for example, the height of the side walls 48 is about 5 mm, and the average width of the upper/lower walls 46 is about 40 mm, giving an aspect ratio of about 8:1. The length of each passage (from inner diameter to outer diameter) is about 100 mm. The passage depth and the mean passage width define the mean hydraulic diameter, which is about 8.9 mm, and the sizes of the openings between passages are at least 8.9 mm. The calculated pressure drop for such an hydraulic diameter is less than 5 psi (pounds per square inch), which is considered to be a suitable minimized pressure drop, with the shortness of the side walls allowing the heat exchanger to have a minimized weight of about 20 pounds and a minimized volume of less than 2 cubic feet. The total area of the upper/lower walls subject to counter-flow is calculated (20 plates) to be about 3 square meters to thereby provide a maximized heat transfer for maximized effectiveness.

It should be understood that there may be design requirements in which a large aspect ratio is not suitable. Thus, there may be design limits in some applications to how large the aspect ratio can be. For example, an 8:1 or larger aspect ratio in some applications may result in the heat exchanger being unsuitably too large in physical size. However, for many applications (for example, for use with many meso-scale turbines, but of course not limited thereto) of heat exchangers having rectangular in cross-section passages, an aspect ratio of at least about 5:1 is considered preferred, more preferably at least about 8:1.

As discussed above, in addition to the requirements of high effectiveness, low pressure drop, and the capacity to handle pressure differences across walls, discussed above, a recuperator for a gas turbine is desirably also relatively low weight. The provision of the passage interconnections internally, i.e., the provision of the offsets 76 (which define passage areas 77 which lie over a passage in the adjacent group of stacked passages) and openings 78, desirably allows the elimination of hardware to complete the connections of passages one to another. Thus, as previously discussed, each radial passage 34 presents a bend (offset portion 76) at one of its ends, with the opening 78 on the floor (wall 46) of the tray or plate. In this manner, the flow is forced to turn towards an adjacent passage in the plate below as it changes level to the plate below. For this reason, there are two types of plates: one 72 which has the openings 78 at the inner radius and the other 74 which has the openings 78 at the outer radius. It is clear, then, that when the plates are stacked alternately, the floor of one tray forms the ceiling of the other, forming the individual flow passages and, thus, the hereinbefore discussed helical path ways, illustrated in FIG. 11, are established. The prototype heat exchanger desirably weighed about 20 pounds, whereby, when combined with the gas turbine weight of about 10 pounds of the gas turbine for use by a foot soldier for which it was built, is a total of about 30 pounds making it suitable for portability by a foot soldier. Thus, a heat exchanger in accordance with the present invention preferably has a volume less than about 2 cubic feet and weighs less than about 20 pounds, and a micro-scale or meso-scale gas turbine incorporating such a heat exchanger in accordance with the present invention preferably weighs less than about 30 pounds.

Thus, it can be seen from the above that the heat exchanger for the present invention desirably has very short side walls 48 subject to co-flow to minimize weight and size and to provide a sufficiently minimized pressure drop and very wide walls 46 subject to counter-flow to achieve maximized effectiveness. Accordingly, in accordance with the present invention, the passages of the heat exchanger have a relatively large aspect ratio of for example, about 8:1, to achieve a suitable balance of maximization of heat transfer and minimization of weight and size to minimization of pressure drop, as discussed above.

In the radial passage configuration of FIGS. 20 to 26, with periodic heat exchange conditions established by the radial geometry as well as the inner wall 106 bounding the combustor, heat losses are desirably generally limited/minimized to those occurring over the radially outer bounding wall 108. In addition to high effectiveness and low pressure drop heat transfer conditions, additional benefits may desirably be derived from such a heat exchanger. Thus, the previously discussed "chess-board pattern" also pertains to the differential pressure between working flows, resulting in cancelling forces acting on the heat exchanger structure, thus allowing for thinner wall fabrication than may otherwise be achievable. Additionally, a catalytic substrate such as, for example, a suitable commercially available platinum-based ceramic catalytic coating (desirably one which is applied as a thin coating) may desirably be applied to the sides of walls in contact with high temperature gas streams, thereby to desirably derive extra heat from incompletely combusted fuel and making it available for heat transfer to the cool-side streams.

In addition, ad-hoc dimensioning of the overlapping helical flow passages may desirably be leveraged to cause sound waves to cancel one other to desirably achieve engine acoustic emission control, i.e., sound dampening. Thus, more specifically, it should be noted that gases flowing radially inwardly converge in the wedge-shaped converging channels of the passage ducts formed by the side walls of the plates 72 and thereby contract. Gases flowing radially outwardly diverge in the wedge-shaped diverging channels of the passage ducts formed by the side walls of the plates 74 and thereby expand. Thus, the widths of the channels formed by the side walls of plates 72 converge (as gases flow radially inwardly to openings 78) from a radially outer width, illustrated at 49, of about 2¼ inches to a radially inner width, illustrated at 51, of, for example, about 1¼ inch and even less (for example, a width of about ¾ inch) as the gases pass through the openings 78. Conversely, the widths of the channels formed by the side walls of plates 74 diverge (as gases flow radially outwardly to openings 78) from the same radially outer width 51, of, for example, about 1¼ inch, to the same radially inner width 49 of, for example, about ¾ inch, before converging through the outer openings 78 then diverging after passage through the openings 78. Such a geometry wherein there are vertically adjacent passages which are alternately converging and diverging to result in alternate contraction and expansion of the gases is provided for acoustic dampening, i.e., to dampen sound waves, which is understood to occur by the alternate convergence and divergence of flows effecting the cancelling of sound vibrations generated by combustion and flow-induced pressure fluctuations. Thus, a geometry such as described above wherein there are alternate passages converging and diverging so that there is alternate contraction and expansion of gases flowing there through serves as a means for acoustic dampening or means for dampening of sound waves generated by such pressure fluctuations. Such geometry may be varied using the converging-diverging principles in accordance with design requirements. Thus, acoustic wave length detuning may be achieved by varying the converging and diverging geometry of the passages.

Figure 12:
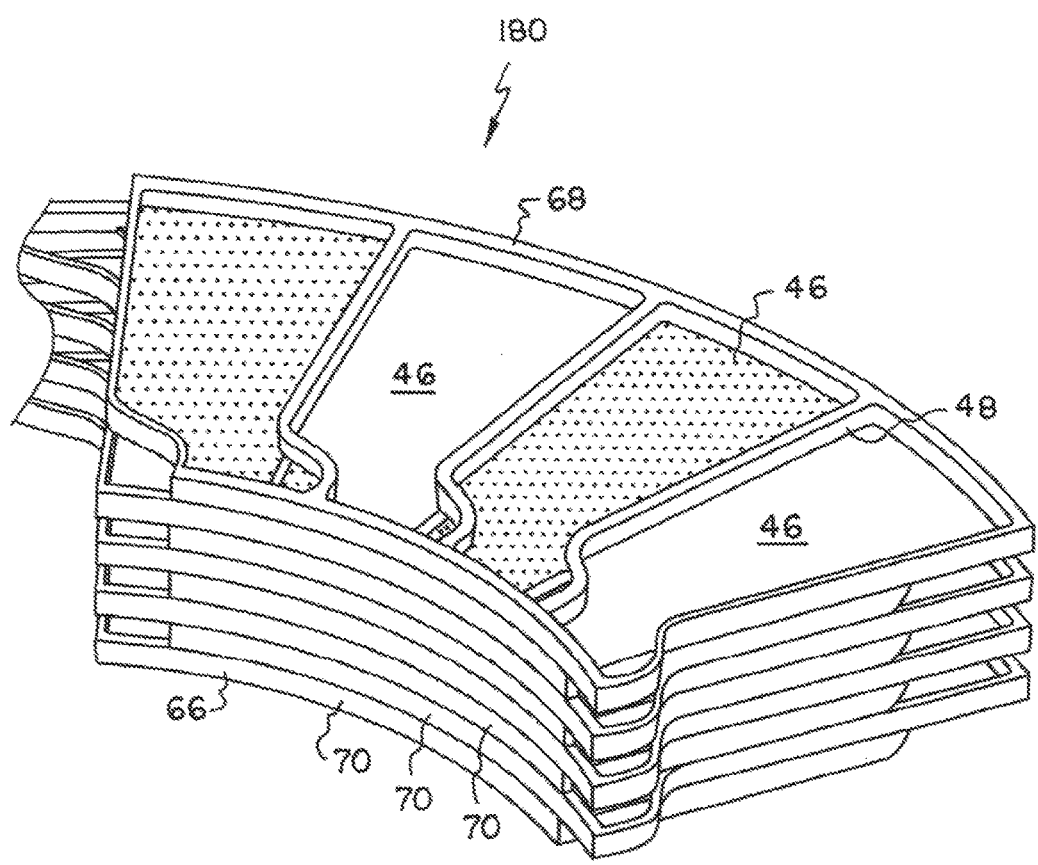
FIG. 12 is a partial perspective view, with an end plate removed for ease of illustration, of a heat exchanger in accordance with the present invention.
Figure 13:
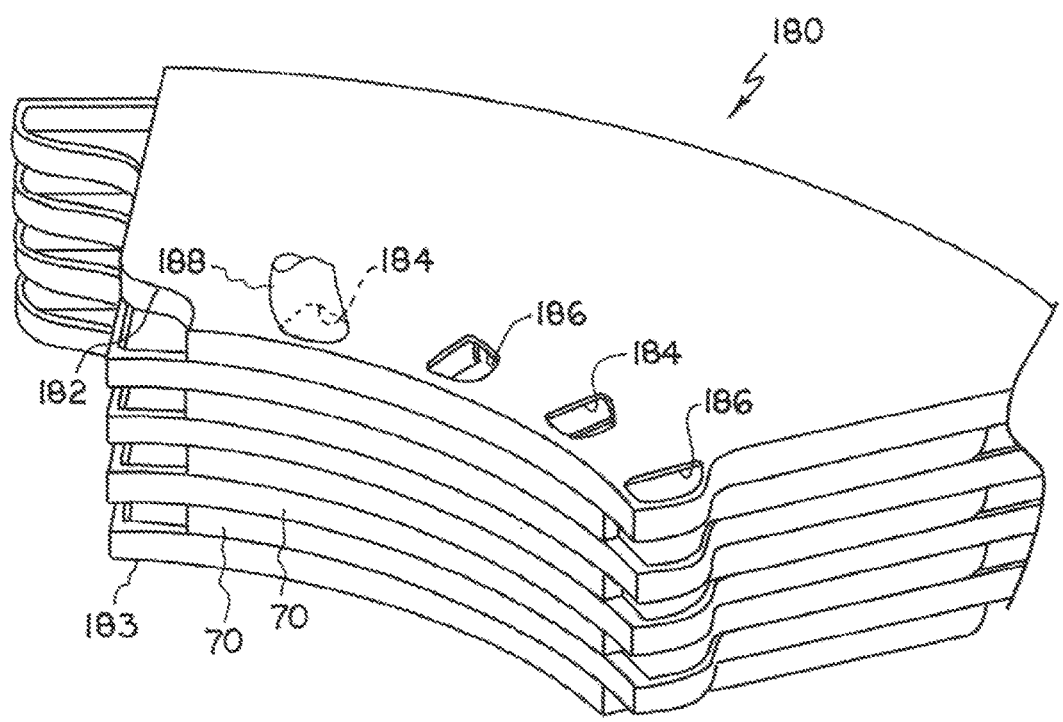
FIG. 13 is a view similar to that of FIG. 12 of the heat exchanger of FIG. 12 incorporating the end plate.

A heat exchanger according to the present invention may be formed from a plurality of plates sealingly welded/brazed or otherwise attached together as hereinbefore described or in various other ways, which may include formation in identical segments which are then suitably sealingly welded or otherwise attached together. An example of such a one-sixth segment (with 8 plate segments 70) is illustrated generally at 180 in FIGS. 12 and 13, with upper and lower cover flange segments 182 and 183 respectively (shown in FIG. 13) removed in FIG. 12 to show the internal passages. The flange segment 182 has circumferentially-spaced holes, illustrated at 184 and 186, adjacent the inner periphery and suitably adapted such as through tubing illustrated at 188 for receiving alternately first and second fluids respectively in first and second helical flow paths similarly as previously discussed for heat exchanger 100 for heat exchange. The flange segment 183 similarly has holes (not shown) adapted such as through tubing for discharging the first and second fluids. While FIGS. 12 and 13 illustrate the segment 180 as comprising a plurality of plate segments 70 connected together, it should be understood that the segment 180 can alternatively be formed as a single piece. Such a segment 180 may be formed by additive manufacturing or 3D printing, namely, direct metal laser sintering or DMLS. Additive manufacturing or 3D printing methods are not limited to metal sintering, as ceramics, plastics, composites, or any other suitable engineering materials could also be used, depending on the application.

Passage segments/heat exchangers may be made in various ways. For example, they may alternatively be made of super-alloy foils cut via wire electro discharge machining or EDM, with plate stock for horizontal walls and with foils for side walls, and using a tab and slot approach for assembly with radially extending locating tabs on the webs which engage radially extending slots in the plate stock, and finished by oven brazing or welding. For another example, the passage segments/heat exchangers may alternatively be made by injection molding.

For yet another example, the passage segments/heat exchangers may alternatively be made by three-dimensional or 3D printing, also called additive manufacturing, which may advantageously provide leak-proofness. In 3D printing, successive layers of flowable material are laid down under computer control into the desired shape and allowed to harden. While 3D metal printing may be expensive (requires melting of metal), 3D ceramic printing to provide a heat exchanger 100 (or segments thereof) advantageously allows printing at room temperature, after which the printed ceramic heat exchanger is cured in an oven (akin to making pottery). The use of 3D plastic printing may be useful for making a heat exchanger for a low temperature application. None of the above methods of manufacture of heat exchangers are to be taken as limiting the invention, as there may be yet other ways to form the helical overlapping passages.

Figure 14:
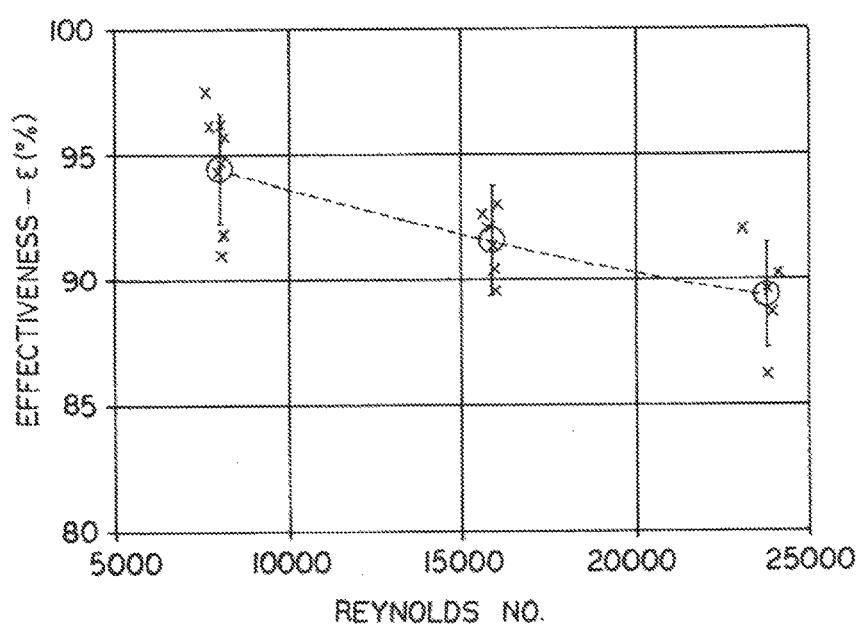
FIG. 14 is a graph showing effectiveness (vs Reynolds no.) during testing of a heat exchanger in accordance with the present invention and having the flow paths illustrated in FIGS. 20 to 28 and built similarly as the heat exchanger of FIGS. 20 to 28.

FIG. 14 shows the results of heat transfer effectiveness, defined in the previously referred to Equation 2, obtained during the test of the heat exchanger 100. It can be seen that for a broad range of passage Reynolds numbers (based on the mean passage hydraulic diameter and mean cool gas-side temperature), the mean effectiveness values lie in a range of 90 to 95%, decaying slightly as a function of Reynolds number increase. For a given Reynolds number, the effectiveness scatter represents a slight positive dependence of effectiveness on the difference between working gas temperatures. Overall, it can be seen that in the range of passage Reynolds numbers corresponding to the particular meso-scale turbine engine in use in the tests, the effectiveness value is essentially constant (i.e., around 90% to 95%).

Figure 15:
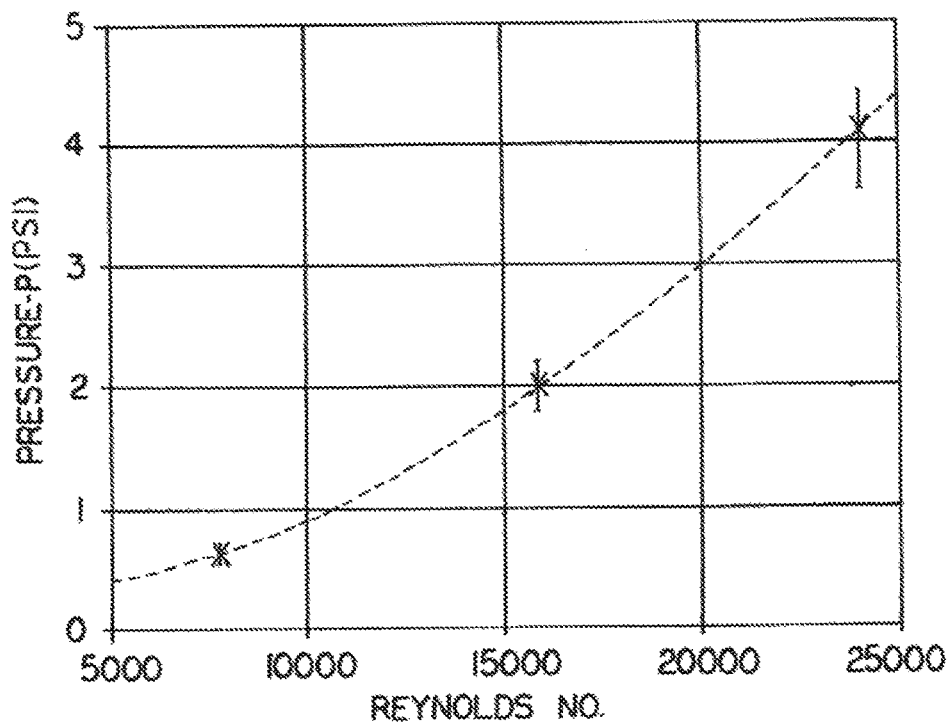
FIG. 15 is a graph showing pressure drop (vs Reynolds no.) during the testing.

FIG. 15 shows the pressure drop, as expected, being quadratic with the Reynolds number. The magnitude of the drop is within a range that can be easily compensated by the mesoscopic turbine engine's compressor.

Figure 16:
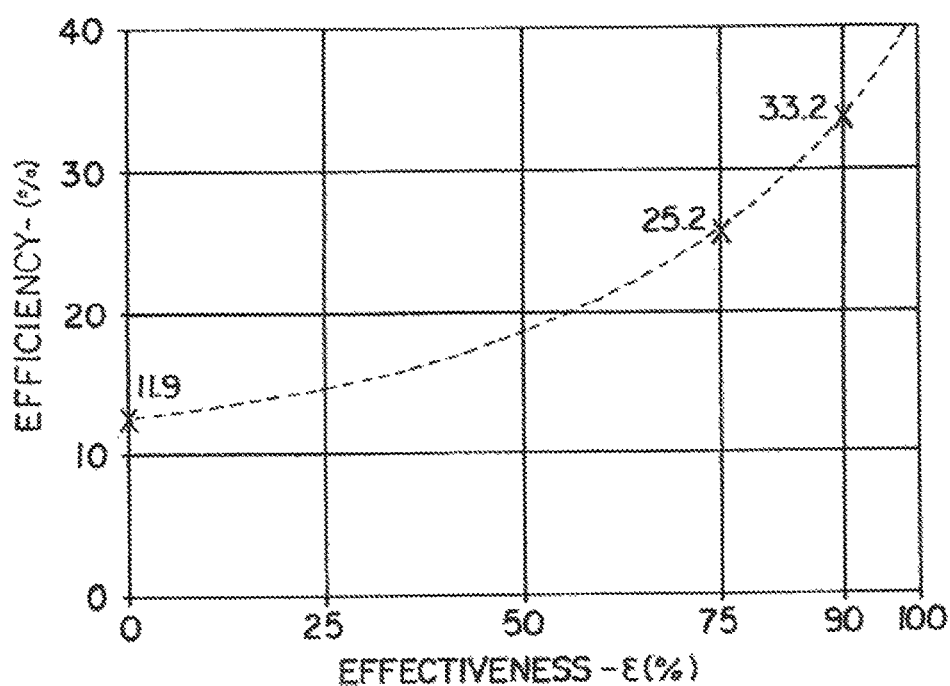
FIG. 16 is a graph showing cycle thermal efficiency vs effectiveness during the testing.

FIG. 16 shows the dependence of cycle or thermal efficiency on recuperator effectiveness, as given by the previously mentioned Equation 3. Cycle or thermal efficiency was calculated to be 11.9%. With a tested effectiveness of approximately 90% and with the low weight (about 20 pounds) desirable for portability, the cycle or thermal efficiency is shown to desirably nearly triple to 33.2% (as compared to 7% to 13% for a typical non-recuperated gas turbine).

In summary, the heat exchanger 100 is comprised of a plurality of cross-sectionally rectangular or otherwise multi-wall passages or ducts which are arranged in a honeycomb formation with shared walls between adjacent passages. The passages are interconnected at their ends, by tubing, or ducting, or internal top, bottom, or sidewall perforations, or any other suitable means to define at least two helical flow paths. The flow paths are arranged so that there is counter-flow between some shared walls of the passages which are maximized to achieve heat transfer and to provide maximized cross-sectional passage area to minimize pressure drop.

The overlapping helical flow paths 30 and 32 of the present invention allow the accommodation of high pressure differentials between the working flows by the cancellation or partial cancellation of forces on opposite sides of passage walls subject to high vs. low pressure working flows. More specifically, this may be explained by the following example. Compressor discharge flows are normally at a higher pressure than turbine exhaust flows. Thus, similarly to the previously discussed chessboard temperature pattern, a chessboard pressure pattern is established. This distributes pressure differentials over the entire structure, desirably avoiding localized areas of high or low pressure, where forces would undesirably be biased in a preferential direction. Advantageously, such cancellation or partial cancellation of forces allows all or some of the walls 44, 46, and 48 to be made thinner to thereby result in even more effective heat transfer.

The cross-sectional dimensions of the passages may also be sized is advantageously provided to allow operation of the heat exchanger in micro-channel heat transfer conditions, characterized by laminar low Reynolds numbers flows and invariant Nusselt numbers. More specifically, since the Reynolds number is a function of the passage's hydraulic diameter, laminar flow conditions are naturally established if the heat exchanger is small enough or if the number of flow passages is high enough.

A heat exchanger in accordance with the present invention may be provided to operate in any suitable flow regime, i.e., laminar (as discussed above), turbulent, incompressible, or compressible, as defined by the Reynolds, Nusselt, or Mach numbers. The duct surfaces may have rugosities, dimpling, tesselation, fins, pins, or any other turbulence-inducing surface treatments or finishes or turbulence-generating features. The alternate flows may be the same or different, i.e., for two flows, they may be liquid/liquid, liquid/gas, gas/liquid, or gas/gas flows. The passage cross-sections may be leveraged such as by angle or curvature modifications as may be suitable to attain desired flow velocities or volume flow rates.

It should be understood that the helical flow passages of the present invention allow the modification and tailoring of heat exchanger designs to attain different predominant heat exchange modes, i.e., counter-flow to co-flow ratios, in accordance with design requirements, by modification of the passage cross-section aspect ratio, i.e., ratio of side wall height 49 to bottom/top wall width 47. The wedge shapes (which may be three-dimensional as well as the two-dimensional version described herein, and the wedge-shaped passages may alternatively be arranged in a hemispherical or spherical manner) of the passages may be additionally used to manage engine acoustic emissions. Also, a hot-gas side catalytic surface may be provided to derive extra heat from incompletely combusted fuel, thereby making more heat available for heat transfer to the cool-gas side.

The heat exchanger based on present invention is thus provided to achieve high heat transfer effectiveness with low pressure losses and low weight and size. It is considered to be particularly well suited to function as an annular recuperator for recovery of exhaust heat from a Brayton Cycle gas turbine engine or similar system.

It should be understood that, while the present invention has been described in detail herein, the invention can be embodied otherwise without departing from the principles thereof, and such other embodiments are meant to come within the scope of the present invention as defined by the appended claims.

What is claimed is:

1. A heat exchanger for exchanging heat between at least two fluids, the heat exchanger comprising walls defining a plurality of passages, each of said passages extends between two termini of the heat exchanger and is defined by at least three of said walls connected together, wherein said walls of each of said passages also define walls respectively of a respective plurality of said passages which are adjacent said each of said passages, said passages including first passages for flowing of a first fluid there through and second passages for flowing of a second fluid there through, the heat exchanger further comprising a plurality of flow paths including first and second flow paths wherein a plurality of said first passages are serially flow connected to define said first flow path for the first fluid through the heat exchanger and wherein a plurality of said second passages are serially flow connected to define said second flow path for the second fluid through the heat exchanger,
wherein said first and second passages are arranged in a plurality of stacks wherein, for at least one of said first flow paths and at least one of said second flow paths, a first of said plurality of stacks comprises a first plurality of said first passages which are alternately stacked with a first plurality of said second passages, wherein a second stack comprises a second plurality of said first passages which are alternately stacked with a second plurality of said second passages, and wherein said second stack is adjacent said first stack, and wherein a third stack comprises a third plurality of said first passages which are alternately stacked with a third plurality of said second passages, and wherein said third stack is adjacent said second stack,
wherein said at least one of said first flow paths for the first fluid is defined by sequential flow through said first plurality of said first passages in said first stack and through said second plurality of said first passages in said second stack such that said at least one of said first flow paths for the first fluid flows helically alternately through said first passages in said first stack and said first passages in said second stack from an inlet to the heat exchanger to an outlet from the heat exchanger,
wherein said at least one of said second flow paths for the second fluid is defined by sequential flow through said second plurality of said second passages in said second stack and through said third plurality of said second passages in said third stack such that said at least one of said second flow paths for the second fluid flows helically alternately through said second passages in said second stack and said second passages in said third stack from an inlet to the heat exchanger to an outlet from the heat exchanger.

2. A heat exchanger according to claim 1 wherein each said passage is defined by four of said walls connected together and wherein each said passage has an aspect ratio of at least about 5:1.

3. A heat exchanger according to claim 1 further comprising in combination therewith a meso-scale gas turbine.

4. A heat exchanger according to claim 1 wherein said termini are radially inner and outer termini whereby said inner terminus defines a central opening in the heat exchanger.

5. A heat exchanger according to claim 4 further comprising in combination therewith a combustor received in said central opening.

6. A heat exchanger according to claim 4 further comprising means for dampening sound waves generated as gases flow through said passages.

7. A heat exchanger according to claim 1 further comprising in combination therewith a meso-scale gas turbine, wherein the heat exchanger has a weight of less than about 20 pounds and a size of less than about 2 cubic feet.

8. A method of exchanging heat between first and second fluids utilizing the heat exchanger of claim 1 comprising counter-flowing the first fluid in at least one of said first passages relative to flow of the second fluid in at least one of said second passages adjacent thereto for exchange of heat across one of said walls and co-flowing the first fluid in said at least one first passage relative to flow of the second fluid in an other of said second passages adjacent thereto.

9. A heat exchanger for exchanging heat between at least two fluids, the heat exchanger comprising a plurality of vertical groups of passages wherein each of said passages extends between two termini of the heat exchanger, wherein each of said passages is defined by a passage upper wall, a passage lower wall, and two passage side walls all connected together, wherein said passages are arranged in a honeycomb formation such that each of said passage upper, lower, and side walls of said each passage defines a passage wall of each of said passages which is adjacent to said each passage respectively, said passages including first passages for flowing of a first fluid and second passages for flowing of a second fluid, a plurality of first flow paths for flow of the first fluid through the heat exchanger wherein each of said first flow paths is defined by a plurality of said first passages being serially connected, a plurality of second flow paths for flow of the second fluid through the heat exchanger, wherein each of said second flow paths is defined by a plurality of said second passages being serially connected, wherein at least one of said first flow paths is arranged in a helical pattern in a first and a second of said vertical groups, wherein, in each of said first and said second of said vertical groups, said passages are alternately first passages and second passages, whereby said at least one of said first flow paths is, beginning with an inlet to the heat exchanger, through one of said first passages in said first of said vertical groups then vertically downwardly and through one of said first passages in said second of said vertical groups then vertically downwardly and through an other of said first passages in said first of said vertical groups and continuing vertically downwardly alternately through said first passages in said first and said second of said vertical groups to an outlet from the heat exchanger, and
wherein at least one of said second flow paths is arranged in a helical pattern in said second and a third of said vertical groups wherein, in said third of said vertical groups, said passages are alternately said first passages and said second passages, whereby said at least one of said second flow paths is, beginning with an inlet to the heat exchanger, through one of said second passages in said second of said vertical groups then vertically downwardly and through one of said second passages in said third of said vertical groups then vertically downwardly and through one of said second passages in said second of said vertical groups and continuing vertically downwardly alternately through one of said second passages in said second of said vertical groups and through one of said second passages in said third of said vertical groups to an outlet from the heat exchanger.

10. A heat exchanger according to claim 9 wherein said termini are radially inner and outer termini whereby said radially inner terminus defines a central opening in the heat exchanger.

11. A heat exchanger according to claim 10 comprising a plurality of alternately stacked first and second plates which are shaped, stacked, and attached together to define said first and second passages, wherein said plates have planar plate walls each having an upper surface and a lower surface and which define said passage upper and lower walls of said first and second passages respectively and wherein each of said plates further has a plurality of circumferentially spaced radially extending plate walls which rise from said respective upper surface thereby defining said plate side walls of said first and second passages respectively, at least one of said plate side walls in said first plates having a major portion which defines a boundary between one of said first and second passages of said first vertical group and one of said first and second passages of said second vertical group, at least one of said plate side walls in said second plates having a major portion which defines a boundary between one of said first and second passages of said first vertical group and one of said first and second passages of said second vertical group, said plates being integral or sealingly attached with said major portions respectively aligned, said at least one of said plate side walls in said first plate having an offset portion adjacent said inner terminus thereby effecting an area of overlap of said respective one of said first and second passages in one of said first and second vertical groups in said first plate over a respective one of said first and second passages in the other of said first and second vertical groups in said respective second plate which is below said first plate, an opening in said area of overlap for passage of a fluid from said respective one of said first and second passages in said one of said first and second vertical groups in said first plate to said respective one of said first and second passages in said other of said first and second vertical groups in said respective second plate which is below said first plate, and said at least one plate side wall in said second plate having an offset portion adjacent said outer terminus thereby effecting an area of overlap of said respective one of said first and second passages of one of said first and second vertical groups in said respective second plate over a respective one of said first and second passages in the other of said first and second vertical groups in said respective first plate which is below said second plate, an opening in said area of overlap for passage of a fluid from said respective one of said first and second passages of said one of said first and second vertical groups in said second plate to said respective one of said first and second passages in said other of said first and second vertical groups in the respective first plate which is below said second plate.

12. A method of exchanging heat between first and second fluids utilizing the heat exchanger of claim 9 comprising counter-flowing the first fluid in at least one of said first passages relative to flow of the second fluid in at least one of said second passages adjacently below said at least one first passage and co-flowing the first fluid in said at least one first passage relative to flow of the second fluid in at least one of said second passages adjacently to one of said side walls of said at least one first passage.

13. A heat exchanger comprising a plurality of stacked plates wherein each of said stacked plates has a floor, a pair of end walls extending upwardly from said floor and defining termini respectively of the heat exchanger, and a plurality of spaced side walls extending upwardly from said floor and between said end walls to define a plurality of side-by-side stacks of passages through the heat exchanger in a honeycomb configuration wherein said floors are sealingly attached to said side walls and said end walls of said stacked plates respectively, and the heat exchanger further comprising means for flow connecting said passages such that at least a first and a second group of said passages are connected serially in a manner to define at least two flow paths respectively through the heat exchanger which at least two flow paths are arranged for flow of at least two fluids respectively for heat exchange between the at least two fluids, wherein said means for flow connecting includes major portions of said side walls which define boundaries of said passages in said stacks of passages respectively, portions of said side walls which are offset from said major portions respectively to overlie ones of said passages respectively in respectively adjacent ones of said stacks of passages, and openings in said floors between said offset portions and said respective end walls respectively for passage of a respective one of the at least two fluids from a passage of one of said stacks of passages to a passage of an adjacent one of said stacks of passages in a helical flow pattern.

14. A heat exchanger according to claim 13 further comprising in combination therewith a meso-scale gas turbine.

15. A heat exchanger according to claim 13 wherein said flow paths are arranged in an at least partially overlapping relationship to each other such that, for a group of first, second, and third ones of said stacks of passages, a first of said at least two flow paths is through said passages of said first and second ones of said stacks of passages and a second of said at least two flow paths is through said passages of said second and third ones of said stacks of passages.

16. A heat exchanger for exchanging heat between at least two fluids comprising passage walls defining a plurality of passages, wherein each of said passages extends between two termini of the heat exchanger, wherein each of said passages is defined by at least three of said passage walls connected together, wherein said at least three of said passage walls of one of said passages also define walls of a respective plurality of adjacent ones of said passages, said passages including first passages for flowing of a first fluid there through and second passages for flowing of a second fluid there through, a plurality of said first passages being serially flow connected to define a first flow path for the first fluid through the heat exchanger, a plurality of said second passages being serially flow connected to define a second flow path for the second fluid through the heat exchanger, wherein said flow paths are arranged in such a way which provides during the exchanging of heat between the first and second fluids flowing through said first and second flow paths respectively both (1) counter-flow and between the first and second fluids in first pairs of said first and second passages wherein respective pairs of the first pairs share a common passage wall, and (2) co-flow between the first and second fluids in second pairs of said first and second passages wherein respective pairs of the second pairs share a common passage wall.

17. A heat exchanger according to claim 16 wherein each of said flow paths is arranged helically and wherein said flow paths are arranged in an at least partially overlapping relationship to each other such that, for a group of first, second, and third stacks of said passages, said first flow path is helically through said passages of said first and second stacks of passages and said second flow path is helically through said passages of said second and third stacks of passages.

18. A heat exchanger according to claim 16 wherein each said passage is defined by four of said passage walls connected together and wherein each said passage has an aspect ratio of at least about 5:1.

19. A heat exchanger according to claim 16 further comprising in combination therewith a meso-scale gas turbine.

20. A heat exchanger according to claim 16 comprising a plurality of alternately stacked first and second plates which are shaped, stacked, and attached together to define said first and second passages, wherein each of said first and second plates has a floor, wherein said floor of a respective one of said first and second plates and said floor of one of said first and second plates which is adjacent said respective one of said first and second plates define said lower and upper passage walls respectively of a respective one of said first and second passages, wherein each of said first and second plates further has a pair of plate side walls and a pair of plate end walls extending upwardly from said floor, wherein said plate side walls of a respective one of said first and second plates define said passage walls respectively of the respective one of said first and second passages each of said plate side walls extending between respective ends of said plate end walls, wherein each of said plate side walls further has a major portion, wherein each of said floors of said first and second plates is sealingly attached to said plate side and end walls in the respectively adjacent one of said first and second plates, wherein said major portions define a plurality of side-by-side groups of vertically stacked ones of said first and second passages, the heat exchanger further comprising internal flow openings each flow connecting a respective one of said passages in one of said side-by-side groups to a respective one of said passages which is below said respective one of said passages in one of said side-by-side groups and which also is in an adjacent one of said side-by-side groups.

21. A heat exchanger according to claim 20 wherein a portion of a respective one of said plate side walls is offset around a respective one of said internal flow openings.

* * * * *